United States Patent
Zink et al.

(10) Patent No.: US 11,919,508 B2
(45) Date of Patent: Mar. 5, 2024

(54) COMPUTER VISION SYSTEM FOR OBJECT TRACKING AND TIME-TO-COLLISION

(71) Applicant: VOLKSWAGEN AKTIENGESELLSCHAFT, Wolfsburg (DE)

(72) Inventors: Edmund Dawes Zink, Rockwall, TX (US); Qiang Liu, Belmont, CA (US); Jens Langenberg, Redwood City, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 355 days.

(21) Appl. No.: 17/530,252

(22) Filed: Nov. 18, 2021

(65) Prior Publication Data
US 2023/0150484 A1    May 18, 2023

(51) Int. Cl.
*B60W 30/08*    (2012.01)
*G06K 9/00*    (2022.01)

(52) U.S. Cl.
CPC ......... *B60W 30/08* (2013.01); *B60W 2420/42* (2013.01); *B60W 2554/4049* (2020.02); *G06F 2218/16* (2023.01)

(58) Field of Classification Search
CPC ............. B60W 30/08; B60W 2420/42; B60W 2554/4049; G06F 2218/16; G06V 10/16; G06V 10/752; G06V 10/44; G06V 20/58
See application file for complete search history.

(56) References Cited

U.S. PATENT DOCUMENTS

| | | | |
|---|---|---|---|
| 10,133,944 B2 | 11/2018 | Zink et al. | |
| 10,229,341 B2 | 3/2019 | Zink et al. | |
| 10,235,565 B2 | 3/2019 | Zink et al. | |
| 10,282,615 B2 | 5/2019 | Zink et al. | |
| 10,694,175 B2 | 6/2020 | Bovyrin et al. | |
| 10,789,495 B2 | 9/2020 | Zink et al. | |
| 10,922,824 B1 | 2/2021 | Zink et al. | |
| 2009/0292468 A1* | 11/2009 | Wu | G08G 1/165 342/146 |

OTHER PUBLICATIONS

Related EP Application No. 22201218.9. Extended EP Search Report (dated Aug. 2, 2023).

(Continued)

*Primary Examiner* — Peter D Nolan
*Assistant Examiner* — Demetra R Smith-Stewart
(74) *Attorney, Agent, or Firm* — Peter Zura; LOZA & LOZA, LLP

(57) ABSTRACT

Technologies and techniques for vehicle perception. A first contour of a current image a dna second contour of a next image are determined relative to an optical center. The current image is scaled to the next image relative to the optical center, wherein the scaling includes applying a scale vector to the first contour. A frame offset vector is determined, and the second contour is translated, based on the frame offset vector and the scale vector, to align the translated second contour to a focus of expansion. An image velocity is determined, based on the first contour and the translated second contour, wherein the image velocity is used to determine object movement from the image data.

20 Claims, 30 Drawing Sheets

(56) References Cited

OTHER PUBLICATIONS

Li et al. "A contour-based approach to multisensor image registration." IEEE Transactions on Image Processing, vol. 4, No. 3, pp. 320-334 (Mar. 1995).
Enkelmann. "Obstacle detection by evaluation of optical flow fields from image sequences." Image & Vision Computing, vol. 9, Issue 3, pp. 160-168 (Jun. 1991).
Longuet-Higgins et al., "The Interpretation of a Moving Retinal Image", Proc. R. Soc. Lond. B 1980 208, 385-397. <http://rspb.royalsocietypublishing.org/content/208/1173/38>.
Negahdaripour et al., "A Direct Method for Locating the Focus of Expansion", Computer Vision Graphics and Image Processing (1989) 46, 3003-326. <DOI: 10.1016/0734-189X(89)90035-2>.
Poiesi et al., "Detection of fast incoming objects with a moving camera", Centre for Intelligent Sensing Queen Mary University of London London, UK, 146.1-146.11. <https://dx.doi.org/10.5244/C.30.146> (2016).
Sazbon et al., "Finding the focus of expansion and estimating range using optical flow images and a matched filter", Machine Vision and Applications, (2004) 15: 229-236. <DOI: 10.1007/s00138-004-0152-7>.
Silva et al., "Egomotion Estimation Using Log-Polar Images", Conference Paper, Feb. 1998. <DOI: 10.1109/ICCV.1998.710833>.

\* cited by examiner

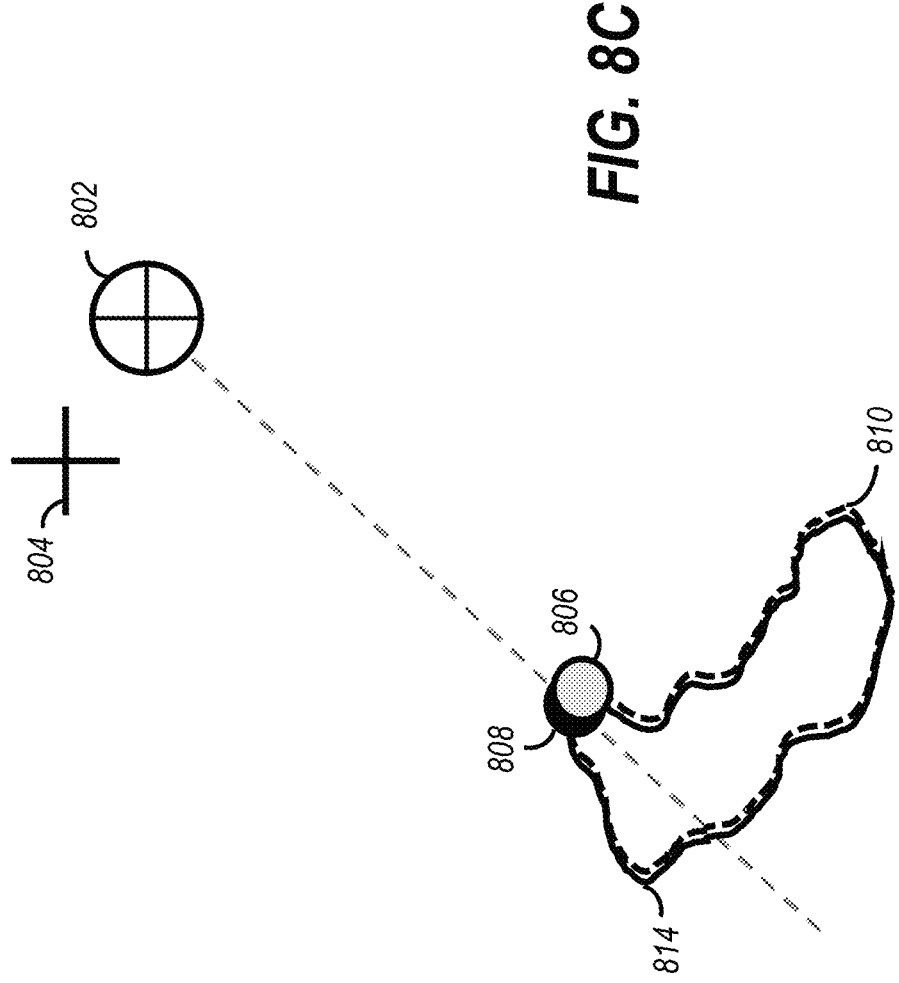

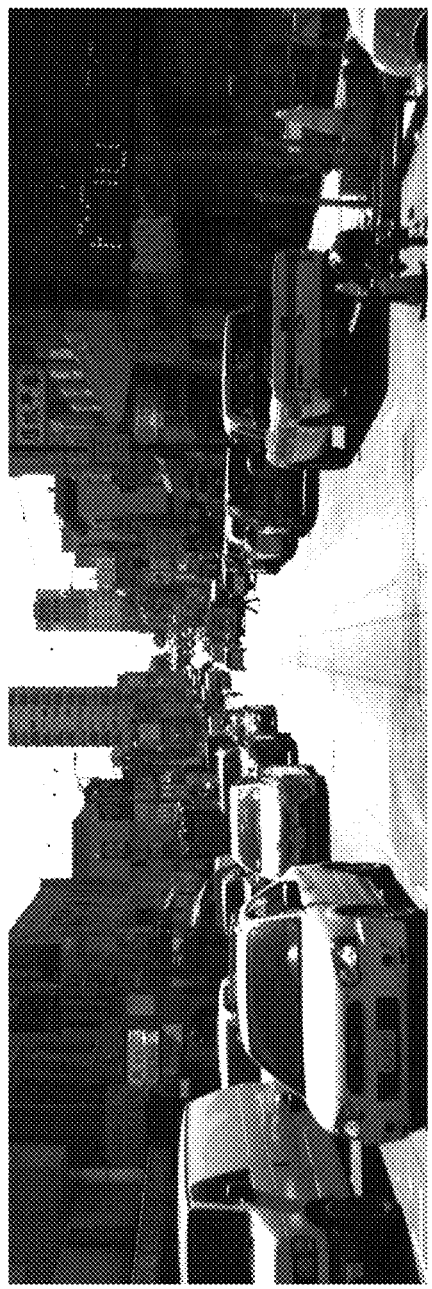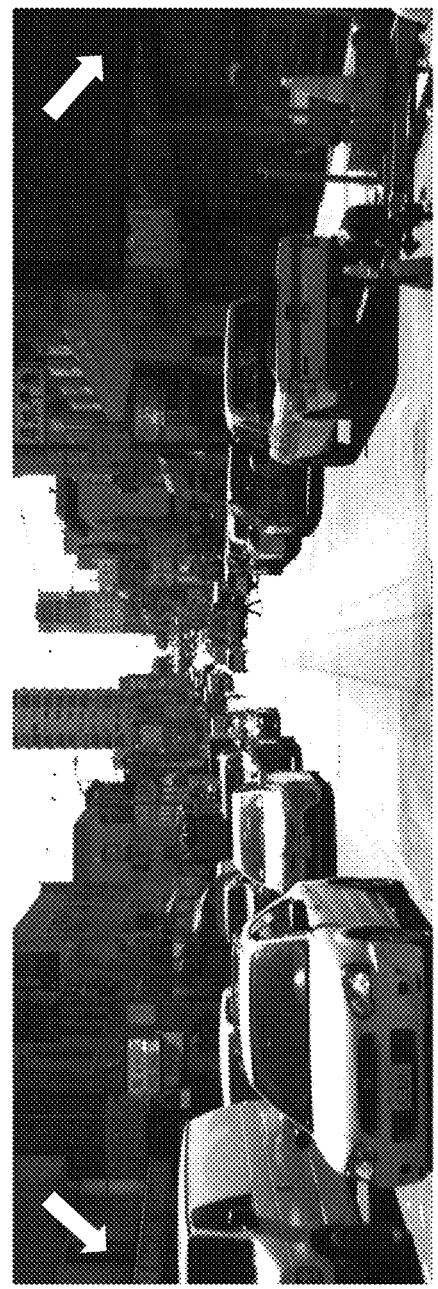

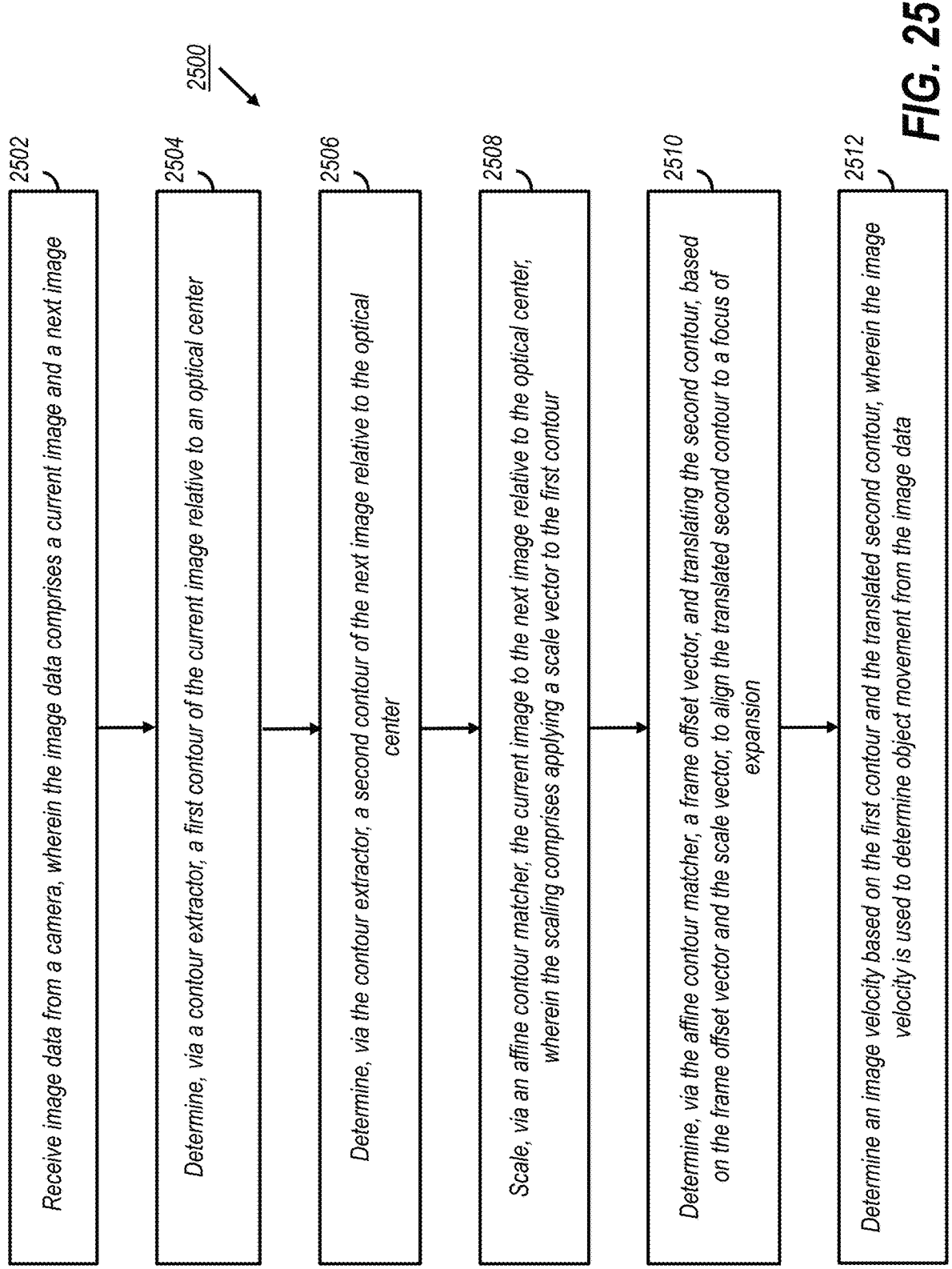

COMPUTER VISION SYSTEM FOR OBJECT TRACKING AND TIME-TO-COLLISION

TECHNICAL FIELD

The present disclosure relates to technologies and techniques for operating optical sensor utilizing contour matching. More specifically, the present disclosure relates to technologies and techniques for aligning optical images produced by optical sensors by processing the images using contour matching, as well as focus-of-expansion (FOE) extraction and contour tracking.

BACKGROUND

Cameras, such as front-facing cameras are generally known in the art, and are typically attached to a forward moving vehicle to capture images and/or video output from each camera. In some configurations, cameras are designed to be coupled to processors, where each image may be processed to determine predicable image flow patterns for all static objects in the scene based on the depth of the object, the position of the object in the image, and the instantaneous translational and angular velocity of the camera, induced by the movement of the vehicle. The image flow of a point in the image with inverse depth may be defined by the instantaneous translational velocity of the camera, and the instantaneous angular velocity of the camera.

In one example, U.S. Pat. No. 10,229,341 to Zink et al., titled "Vector Engine and Methodologies Using Digital Neuromorphic (NM) Data", issued Mar. 12, 2019, describes techniques for processing intensity values measured by photoreceptors to determine velocity vector data indicative of the image data gathered by the image sensor. The velocity vector data is configured to represent a velocity space that includes a spatial and temporal representation of the image data generated by the photoreceptors. Object detection, classification and/or tracking may then be performed, based on the velocity vector data. U.S. Pat. No. 10,229,341 is incorporated by reference in its entirety herein.

In another example, U.S. Pat. No. 10,282,615 to Zink et al., titled "System and Method for Root Association in Image Data", issued May 7, 2019, describes a neuromorphic vision system for generating and processing image data within a field of view. Shapelet data that is based on image data received from an image sensor is generated, and contours are generated corresponding to the field of view based on the shapelet data. During contour generation, a processor may be configured to identify roots based on the shapelet data according to predetermined root profiles, link a number of the roots according to predetermined link profiles to form a number of edges, and connect the number of edges according to predetermined connection profiles to define at least one contour. U.S. Pat. No. 10,282,615 is incorporated by reference in its entirety herein.

In another example, U.S. Pat. No. 10,789,495 to Zink et al., titled "System and Method for 1D Root Association Providing Sparsity Guarantee in Image Data", issued Sep. 29, 2020, describes a neuromorphic vision system for generating and processing video image data within a field of view. Intensity data is generated from video image data, where the roots of the intensity data is identified to sub-pixel accuracy. The roots are identified over time based on a minimum spacing existing between adjacent roots in which no other roots can be located, wherein the identified roots over time are used to associate roots to generate root velocities, whereby roots having the same velocity are associated with one another, and wherein the associated roots form at least one contour of an object in the field of view. U.S. Pat. No. 10,789,495 is incorporated by reference in its entirety herein.

In a further example, U.S. Pat. No. 10,922,824 to Zink et al., titled "Object Tracker Using Contour Filters and Scalers", issued Feb. 16, 2021, describes an image data processing system for processing image data from an image sensor. An affine contour filter extracts sub-pixel contour roots that are dimensionless points consistent across a plurality of frames of image data and represent boundaries of image data that represent an object within the image, wherein the contours undergo small affine changes including at least one of translation, rotation and scale in image data. Lateral contour tracking is performed to track movement of the object within a field of view by aligning contours associated with the object in space-time, wherein contours of each incoming image are aligned to a map frame to map the contours using tethers to track the object. Each tether may be configured to provide a connection between roots of similar polarity on two different frames and enable interpolation of locations of roots on a sub-pixel basis to associate roots across successive frames in the plurality of frames of image data. U.S. Pat. No. 10,922,824 is incorporated by reference in its entirety herein.

As the need for more accurate and robust image processing increases, conventional technologies and techniques do not provide the necessary accuracy and/or robustness needed in today's operating environments. Often times, image data processing must be combined with other types of sensors (e.g., radar, LiDAR, etc.) to identify and/or track objects, as well as determine object positions relative to a vehicle.

SUMMARY

Various apparatus, systems and methods are disclosed herein relating to Vehicle perception. In some illustrative embodiments, a sensor processing system for vehicle perception, is disclosed, comprising: a memory, configured to receive image data from a camera, wherein the image data comprises a current image and a next image; a contour extractor, operatively coupled to the memory, wherein the contour extractor is configured to (i) determine a first contour of the current image relative to an optical center, and (ii) determine a second contour of the next image relative to the optical center; and an affine contour matcher, operatively coupled to the contour extractor, wherein the affine contour matcher is configured to (i) scale the current image to the next image relative to the optical center, wherein the scaling comprises applying a scale vector to the first contour, (ii) determine a frame offset vector, and (iii) translate the second contour, based on the frame offset vector and the scale vector, to align the translated second contour to a focus of expansion, wherein the sensor processing system is configured to determine an image velocity based on the first contour and the translated second contour, wherein the image velocity is used to determine object movement from the image data.

In some examples, a method for vehicle perception is disclosed, comprising: receiving image data from a camera, wherein the image data comprises a current image and a next image; determining, via a contour extractor, a first contour of the current image relative to an optical center; determining, via the contour extractor, a second contour of the next image relative to the optical center; scaling, via an affine contour matcher, the current image to the next image relative to the optical center, wherein the scaling comprises applying a scale vector to the first contour; determining, via the affine contour matcher, a frame offset vector, and translating the second contour, based on the frame offset vector and the scale vector, to align the translated second contour to a focus of expansion; and determining an image velocity based on the first contour and the translated second contour, wherein the image velocity is used to determine object movement from the image data.

In some examples, a computer-readable storage medium, including a set of executable instructions is disclosed that causes a vehicle sensor processing system to: receive image data from a camera, wherein the image data comprises a current image and a next image; determine a first contour of the current image relative to an optical center; determine a second contour of the next image relative to the optical center; scale the current image to the next image relative to the optical center, wherein the scaling comprises applying a scale vector to the first contour; determine a frame offset vector, and translate the second contour, based on the frame offset vector and the scale vector, to align the translated second contour to a focus of expansion; and determine an image velocity, based on the first contour and the translated second contour, wherein the image velocity is used to determine object movement from the image data.

BRIEF DESCRIPTION OF THE FIGURES

The present invention is illustrated by way of example and not limitation in the figures of the accompanying drawings, in which like references indicate similar elements and in which:

FIGS. 8A-8C illustrate an operation of an affine contour matching process on a single image point according to some aspects of the present disclosure;

FIGS. 13A-13B illustrate simulated images of a current and next frames according to some aspects of the present disclosure;

FIG. 25 illustrates a method for vehicle perception for a sensor processing system according to some aspects of the present disclosure.

DETAILED DESCRIPTION

Figure 1:
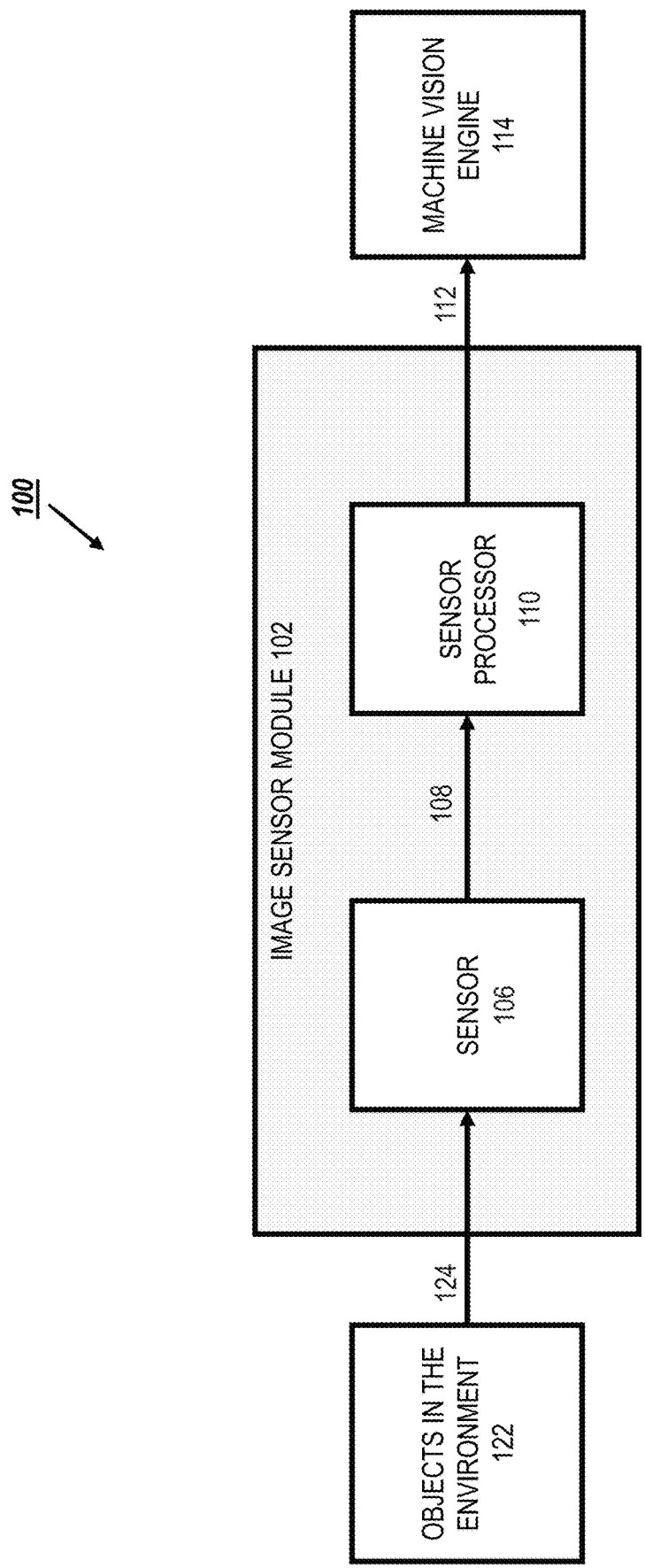
FIG. 1 shows a simplified block diagram of an image sensor module and machine vision engine for processing image data according to some aspects of the present disclosure.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that the term "module" as used herein does not limit the functionality to particular physical modules, but may include any number of tangibly-embodied software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via Scalable Language ("Scala"), Open CV, Python, C, C++, C#, Java, Actionscript, Objective-C, Javascript, CSS, XML, etc.).

FIG. 1 shows a simplified block diagram 100 of an image sensor module 102 and machine vision engine 114 for processing image data (also referred to as frame data) according to some aspects of the present disclosure. In this example, objects in the environment 122 (e.g., objects detectable within the scope of a sensor—see FIG. 2) reflect light 124, which may be captured by sensor 106. The sensor 106 produces sensor data 108, that may include video data, and is input into the sensor processor 110. In some examples, the sensor processor 110 may be configured to process the sensor data to generate a time-to-collision (TTC) contour cloud, which may be processed by machine vision engine 114 to automatically detect, classify, and track objects in the contour cloud.

Commercially available image detection and processing equipment routinely use solid-state detectors to capture large numbers of images/frames each second. By displaying those images at high speed, the viewer has the illusion of motion. This is the basis of recorded video images. However, when such video data is analyzed by computers running image processing and analysis software, the large number of frames used to give the impression of motion can overwhelm the computational capability of the computers. This is because a high frame rate video may provide so much data that the computer is incapable of analyzing the data because the data is changing too quickly. Conventionally, efforts have been made to increase the ability for image processing by increasing the processing speed of processors analyzing the image data.

Alternatively, recent advancements have been made in the area of neuromorphic (NM) processing techniques that mimic or simulate the human eye. NM processing relies on the idea that it is not necessary to analyze all of the data included in a video image; rather NM prioritizes analysis on determining the changes that occur in the image data while de-prioritizing the image data that remains the same from frame to frame because the non-changing data is redundant. More specifically, by mimicking operation of the human eye and brain, processors and software can capture and identify image data of interest, spatial and temporal changes, and output that data for labor intensive image processing that enables all aspects of image processing, automation and assistive control, analysis and diagnostic systems utilizing image processing. This requires the ability to continuously track and record pixel amplitudes for only those pixels amplitudes changes above a prescribed threshold. Conventionally, this approach has been implemented using analog NM cameras; however, application of such technology provides high effective frame rates but with spatial image sizes and spatial resolutions due to the extra cost of analog processing embedded into each pixel of the imager. Thus, until recently, there been no conventional mechanism to effectively use NM image processing for real-time acquired image data. One more recent example is illustrated in U.S. Pat. Pub. No. 2021/0049774 to Zink et al., titled "Object Tracking Using Contour Filters and Scalers" filed Aug. 13, 2019, the contents of which is incorporated by reference in its entirety herein.

In the example of FIG. 1, sensor 106 may output the image data 108 into one or more sensor processors 110 that may be configured to convert that image data into shapelet data that may include intensity data and data derived or derivable from such intensity data, including "spikes," "roots", "blobs", "edges", "contours", and associated data using image processing and data processing techniques explained herein. More specifically, in at least one embodiment, the sensor processor 110 includes digital circuitry that generates spike data indicative of a spike whenever the measured intensity value exceeds a threshold.

Additionally, the sensor processor 110 may be configured to generate shapelet data 112 based on the image data 108, and process the shapelet data using an object signature detector for extracting features of the object from the shapelet data. In some examples, the shapelet data may include image data economized for vision processing. Thus, the shapelet data may be processed by the sensor processor 110 for object signature detection for subsequent analysis to formulate one or more object signatures for subsequent analysis by a machine vision engine 114.

The shapelet data 112 may include economized image data, which can include any suitable targeted economization of the image data, and may include light intensity data, and/or data derivable therefrom using image processing and data processing techniques explained herein (e.g., "spikes," "roots", "blobs", "edges", "contours", and associated data). More specifically, in at least one embodiment, the sensor processor 110 can be used to provide (i.e., define, identify, generate, and/or otherwise establish) other economized image data, for example, roots, blobs, and/or other image processing data based on the image data 108, which may be referred to collectively and/or individually as "shapelet data."

As a result, root association may be performed, which includes the generation of shapelet data that may include blobs, roots, spikes, edges or contours along an orientation and associating the roots. Moreover, roots can be linked or associated unambiguously with each other to enable extraction of contours, or edges (i.e., deterministic linkages of roots comprising contours) related to the image data and preferably related to the object 102. The extracted contours can be used to discern object motion within the field of view of an image sensor, which enables object tracking. This involves the generation of velocity vector data, which include "velocity vectors" which are a mathematical representation of optical flow of pixels in image data, wherein a velocity may be considered to be an angle in space-time, which may be conceptually thought of as a stack of temporally ordered images.

Thus, velocity vector data may be used to characterize or represent a velocity space, which may be thought of as the spatial and temporal representation of video data which includes a sequence of temporally ordered spatial images in a plurality of frames depicting movement of an object in an environment. More specifically, in velocity space, pixels having the same velocity vector may be aggregated and associated with one another to perform velocity segmentation, which enables the ability to identify and differentiate objects within the image data based on their relative motion over frames of image data. Thus, velocity vector data may be used to indicate basic features (e.g., edges) of objects included in the image data, by identifying boundaries between the edges of the objects in the image data. This data may, therefore, be used to define one or more boundaries between foreground objects and background, thus creating velocity silhouettes, or blobs. In this way, velocity silhouettes, or blobs, may define edges at the boundary between a foreground object and a background object.

In this way, disclosed embodiments provide a machine vision system including an image sensor module that includes at least one sensor, and potentially an array of sensors, a sensor processor that includes an object signature detector. The machine vision engine 114 can perform further image and data processing operations on the velocity vector data generated by the image sensor module 102 that enables image data processing for further processing, for example, object classification, including machine and deep learning. As such, in accordance with at least one embodiment, the machine vision engine 114 may include one or processors running software to output data for analysis and subsequent control of components with the environment imaged by the image sensor module 102.

Figure 2:
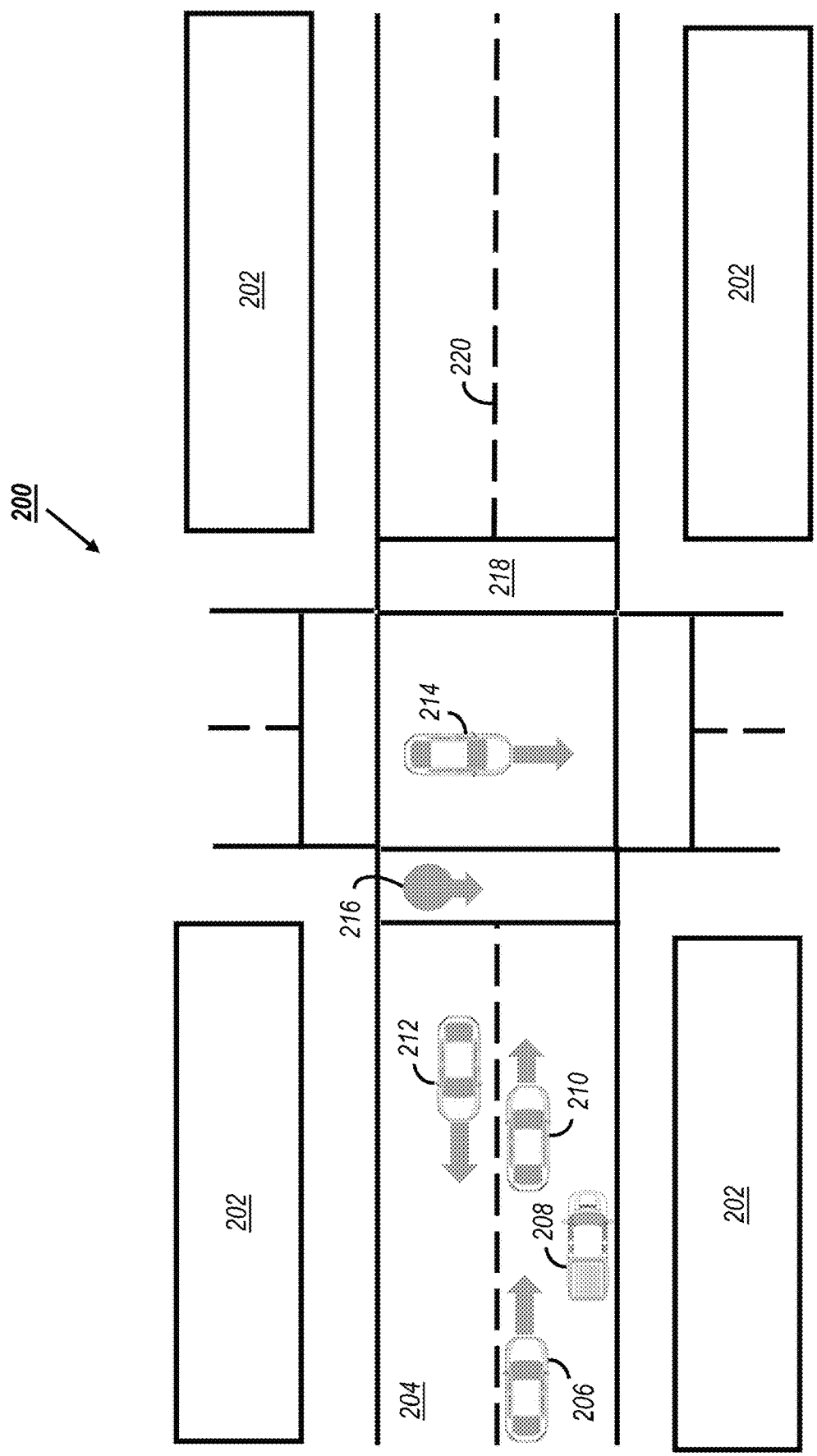
FIG. 2 shows a simplified operating environment illustrating physical relationships between an ego vehicle that may include one or more front facing image sensors to determine a relative position of the ego vehicle and its surroundings.

FIG. 2 shows a simplified operating environment 200 illustrating physical relationships between an ego vehicle 206 that may include one or more front facing image sensors (e.g., 102) to determine a relative position of the ego vehicle 206 and its surroundings. In this example, an ego vehicle 206 may be configured with one or more front facing image sensors mounted on the roof and/or the windshield. During operation, the ego vehicle 206 may be either moving or stopped along road 204. As can be seen in the figure, and explained in greater detail below, the ego vehicle 206 may be configured to visually track numerous types of objects utilizing contour matching (e.g., 312-318) and/or contour tracking (e.g., 320). One type of object may be a static object, generally defined as any object stationary relative to the ground. Examples include parked vehicle 208, road surface 204, cross walks 218, lane markings 220, and buildings/structures 202. Another type of object may be a parallel dynamic object, generally defined as any solid nondeformable object that is moving parallel to the ego vehicle's current direction-of-travel. Examples in the figure include vehicles 210 and 212. Another type of object may be a rigid non-parallel dynamic object, which may be generally defined as any solid nondeformable object that is not exactly parallel to the ego vehicle's current direction-of-travel. Such an example is illustrated as vehicle 214 in FIG. 2. Another type of object may be a non-rigid dynamic object, which may be generally defined as any solid object undergoing deformation. An example of this is shown as pedestrian 216 in the example.

For example, as shown in FIG. 2, an ego vehicle 206, may include one or more image sensor(s) (e.g., 102) that may be used to not only determine the position of the ego vehicle 206 relative to the roadway 204 on which it is travelling, but also positioning of other objects (e.g., static objects, parallel dynamic objects, rigid non-parallel dynamic objects, non-rigid dynamic objects, etc.) in various lanes of traffic on the roadway 204. Providing precise image data regarding these locations and the relative positions may be necessary for enabling effective scout/following car operations, e.g., platooning and other assistive/autonomous driving functionality.

For the purposes of this disclosure, the phrase "autonomous and/or assistive functionality" refers to functionality that enables the partial, full or complete automation of vehicular control ranging and encompassing what has presently come to be known as the five levels of driving automation. Thus, it should be understood that autonomous and/or assistive functionality refers to operations performed by a vehicle in an automated manner by on-vehicle equipment or the output of alerts, prompts, recommendations or directions to a user, wherein these outputs are generated in an automated manner by on-vehicle equipment. Moreover, autonomous and/or assistive functionality may include driver assistance functionality (level one) wherein on-vehicle equipment assists with, but does not control, steering, braking and/or acceleration, but a driver ultimately controls accelerating, braking, and monitoring of a vehicle surroundings.

It should be understood, therefore, that such autonomous and/or assistive functionality may also include lane departure warning systems which provide a mechanism to warn a driver when a transportation vehicle begins to move out of its lane (unless a turn signal is on in that direction) on freeways and arterial roads. Such systems may include those that warn the driver (Lane Departure Warning) if the vehicle is leaving its lane (visual, audible, and/or vibration warnings) and which warn the driver and, if no action is taken, automatically take steps to ensure the vehicle stays in its lane (Lane Keeping System).

Likewise, autonomous and/or assistive functionality may include partial automation (level two), wherein the transportation vehicle assists on steering or acceleration functions and correspondingly monitoring vehicle surrounding to enable a driver to disengage from some tasks for driving the transportation vehicle. As understood in the automotive industry, partial automation still requires a driver to be ready to assume all tasks for transportation vehicle operation and also to continuously monitor the vehicle surroundings at all times.

Autonomous and/or assistive functionality may include conditional automation (level three), wherein the transportation vehicle equipment is responsible for monitoring the vehicle surroundings and controls steering, braking and acceleration of the vehicle without driver intervention. It should be understood that, at this level and above, the on-vehicle equipment for performing autonomous and/or assistive functionality will be interfacing with or include navigational functionality so that the components have data to determine where the vehicle is to travel. At level three and above, a driver is theoretically permitted to disengage from monitoring vehicle surroundings but may be prompted to take control of the transportation vehicle operation under certain circumstances that may preclude safe operation in a conditional automation mode.

Thus, it should be understood that autonomous and/or assistive functionality may include systems which take over steering, keep the transportation vehicle centered in the lane of traffic.

Likewise, autonomous and/or assistive functionality may include high automation (level four) and complete automation (level five), wherein on-vehicle equipment enabled automated steering, braking, and accelerating, in response to monitoring of the surroundings of the vehicle in an automated manner without driver intervention.

Therefore, it should be understood that autonomous and/or assistive functionality may require monitoring of surroundings of a vehicle including the vehicle roadway as well as identification of objects in the surroundings so as to enable safe operation of the vehicle in response to traffic events and navigational directions, wherein that safe operation requires determining when to change lanes, when to change directions, when to change roadways (exit/enter roadways), when and in what order to merge or traverse a roadway junction, and when to use turn signals and other navigational indicators to ensure other vehicles/vehicle drivers are aware of upcoming vehicle maneuvers.

Further, it should be understood that high and full automation may include analysis and consideration of data provided from off-vehicle sources in order to make determinations of whether such levels of automation are safe. For example, autonomous and/or assistive functionality at such levels may involve determining the likelihood of pedestrians in the surroundings of a transportation vehicle, which may involve referencing data indicating whether a present roadway is a highway or parkway. Additionally, autonomous and/or assistive functionality at such levels may involve accessing data indicating whether there is a traffic jam on the present roadway.

Figure 3:
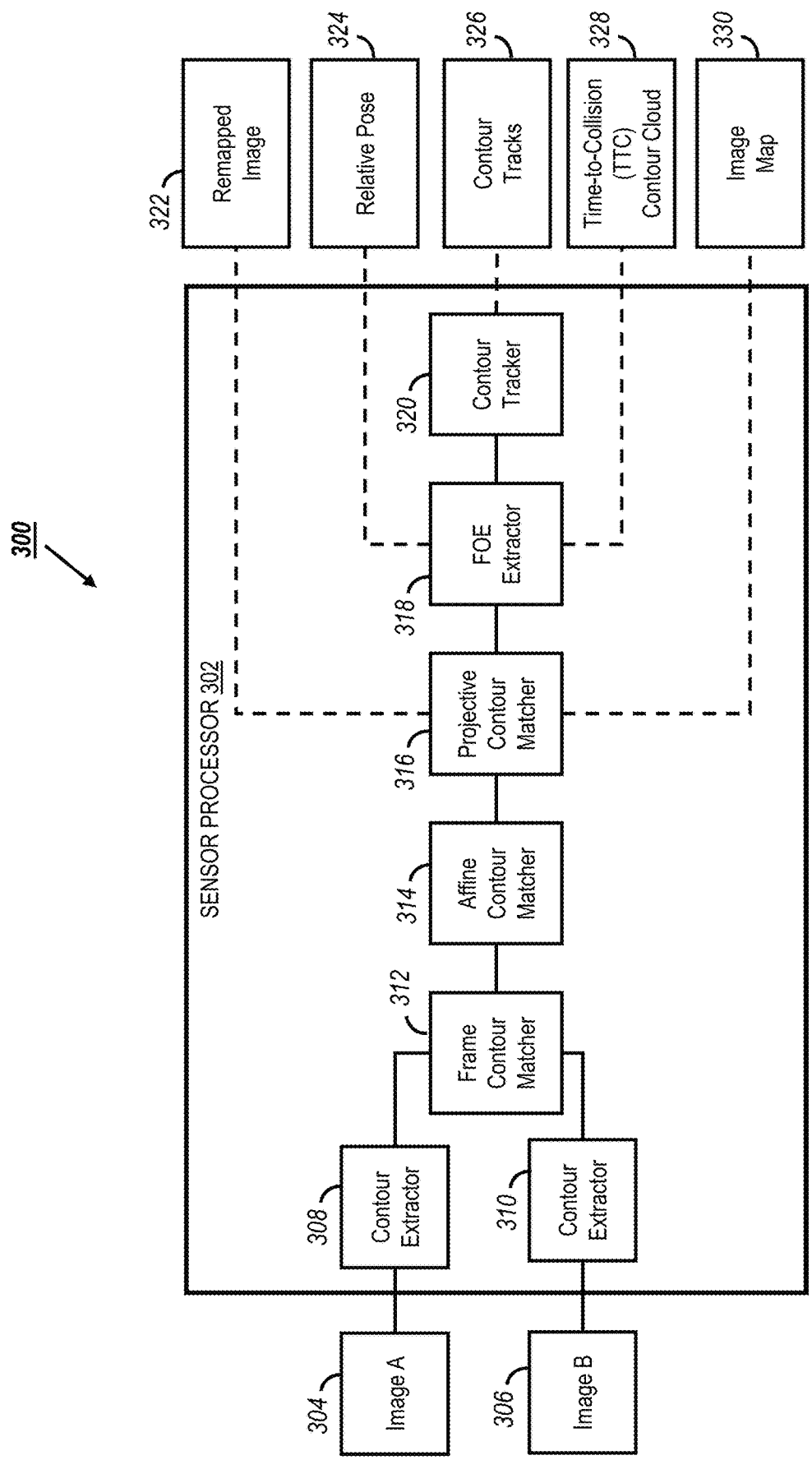
FIG. 3 shows a simplified block diagram of a sensor processor for processing image data and applying contour matching, FOE extraction and contour tracking to determine image characteristics according to some aspects of the present disclosure.

FIG. 3 shows a simplified block diagram 300 of a sensor processor 302 for processing image data and applying contour matching, FOE extraction and contour tracking to determine image characteristics according to some aspects of the present disclosure. In this example, image A 304, which may be configured as a current image, is received in a contour extractor logic 308 of sensor processor 302. For the purpose of reference, a simulated image of a current frame (image A) is illustrated in FIG. 13A, below. An image B 306, which may be configured as a next image in a series of frames, is received in another respective contour extractor logic 310 of sensor processor 302. A simulated image of a next frame (image B) is illustrated in FIG. 13B. Returning to FIG. 3, the outputs of each contour extractor logic 308, 310 are then provided to frame contour matcher 312. It should be understood by those skilled in the art that, while two separate contour extractors (308, 310) are illustrated, both contour extractors may be integrated as a single logic and/or circuit under some examples.

Figure 14A:
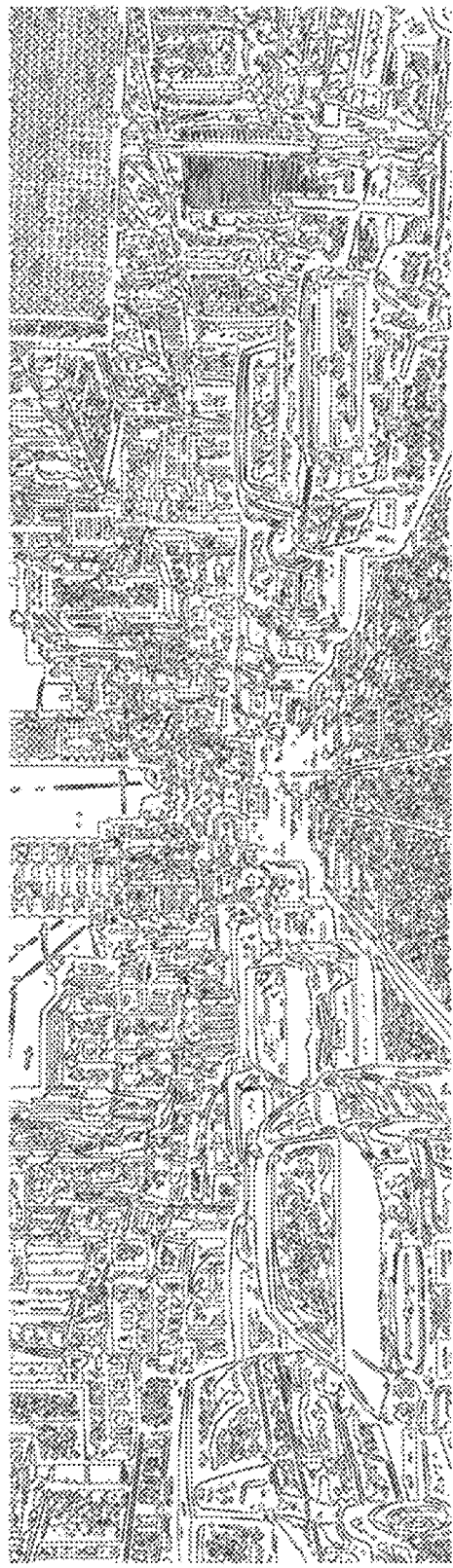
FIGS. 14A-14B illustrate a simulated contour image of the current and next frames according to some aspects of the present disclosure.
Figure 14B:
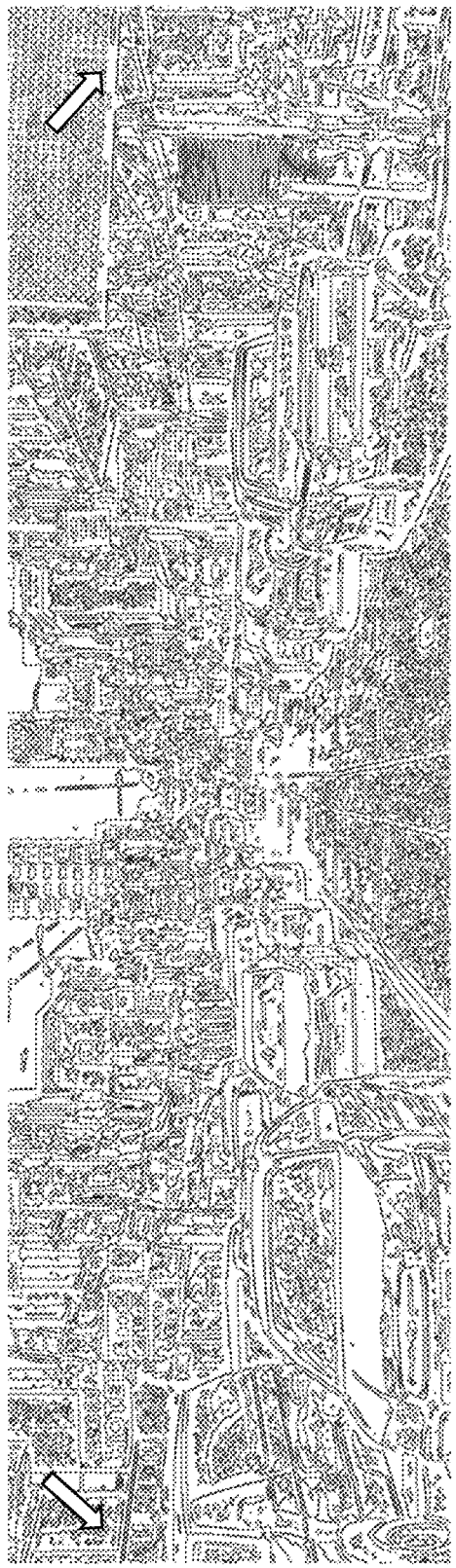
Figure 15A:
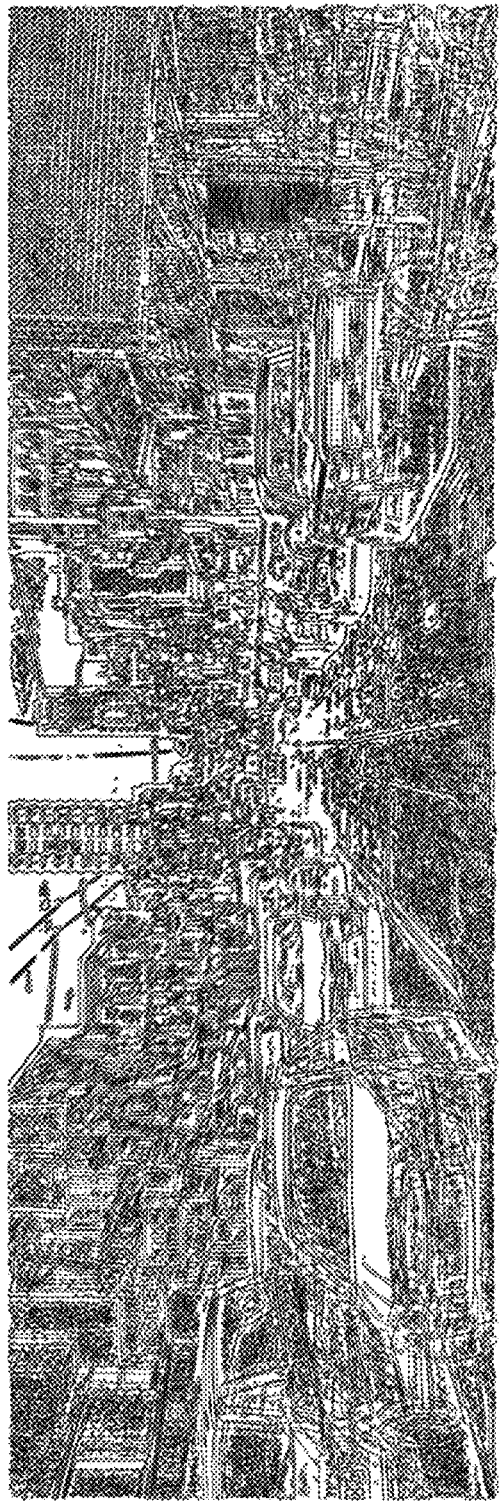
FIGS. 15A-15B illustrate simulated before and after effects of a frame contour matching process according to some aspects of the present disclosure.
Figure 15B:
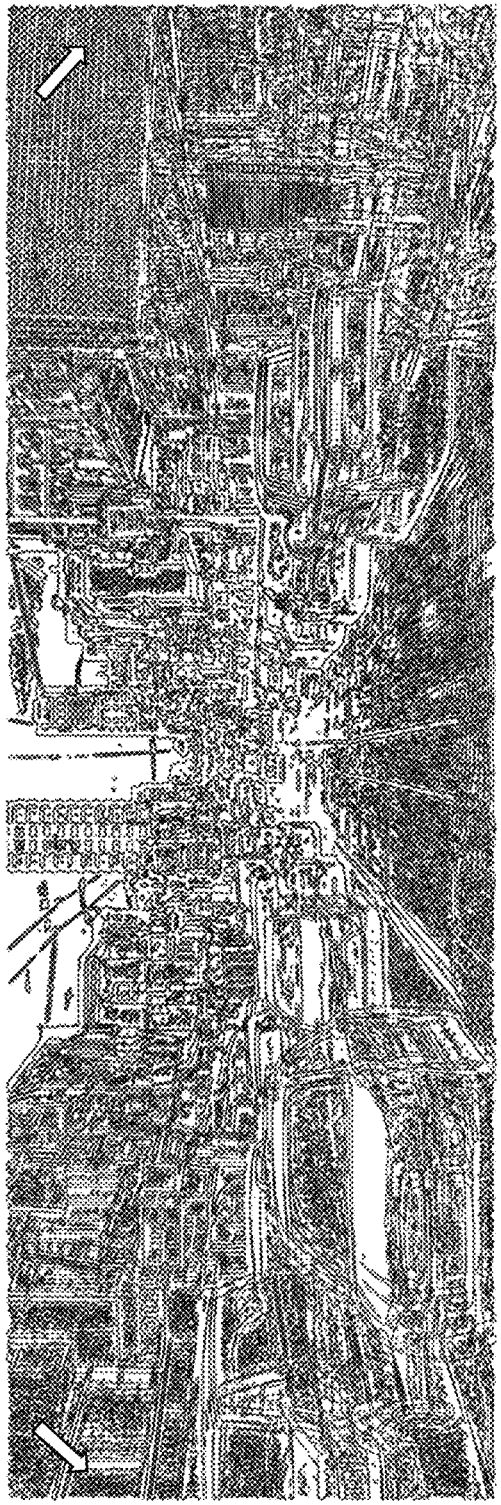

Generally, contour extractor logics 308, 310 may be configured to generate contours from current image A 304 and next image B 306. For reference, examples of simulated outputs of contour extraction logics 308, 310 illustrating a current image, and a next image, are shown in FIGS. 14A and 14B, respectively, below. In some examples, frame contour matcher logic 312 uses the contours from contour extractors 308, 310 to match the next frame (image B 306) to an optical center of the current frame (image A 304). An example of a simulated output of frame contour matcher logic 312 illustrating a current image and a next image is shown in FIGS. 15A and 15B, respectively. The offset used to match the next frame with the current frame in frame contour matching logic 312 may be stored as a frame offset vector that may be utilized in subsequent operations. The output of frame contour matching logic 312 is then transmitted to affine contour matcher logic 314 that may be configured to estimate image velocity for a coarse grid of points across the image using affine transformation. The coarse grid of image velocities may then be used to initialize a finer projective contour grid in projective contour matcher logic 316. An example of a simulated output of affine contour matcher logic 314 illustrating a series of images for image scales 1, 2, 3, 4 and 5 are shown in FIGS. 16A through 16E, respectively, and are discussed in greater detail below. FIG. 17 illustrates a simulated application of an affine contour grid to an image via affine contour matcher logic 314 according to some aspects of the present disclosure.

The term "affine transformation" as used herein may refer to a linear mapping operation that preserves points, straight lines, and planes. In accordance with disclosed embodiments, an affine transformation may be used to apply relative translation, rotation, and scaling to an image. This may be performed resampling an image under minor (small) relative translation, rotation, and scale changes with the goal of preserving its underlying root structure. Applying the affine transformation and resampling enables the ability to identify significantly smaller changes in the size or position of a detected object, thereby improving the sensitivity of the hardware based on this change. In this way, various examples provide the ability to increase equipment sensitivity for depth (indicative of scale), longitudinal movement (distance to sensor), as well as lateral movement and relative rotational movement.

Various disclosed embodiments provide technical utility in that the image sensor processor 302 may utilizes an affine contour filter to improve image processing precision. Conventionally, there is no mechanism for extracting precise sub-pixel roots of contours that represent the boundaries of blobs (i.e., continuously connected component in image data that results from taking the double derivative of the image intensity surface using 2D band-pass filtering) set of data indicative of an object or part of an object in a field of view of an image sensor), which are linked contours identified indicative of an object in image data, when the image is susceptible to small affine changes such as translation, rotation, and scale. For example, when image data is generated by an image sensor, e.g., camera or other known image detection equipment, that is in motion, the image data acquired by the image sensor are particularly susceptible to translation, rotation and changes of image scale because of the relative movement of the image sensor to the objects included in an image scene detected by the sensor.

Figure 18:
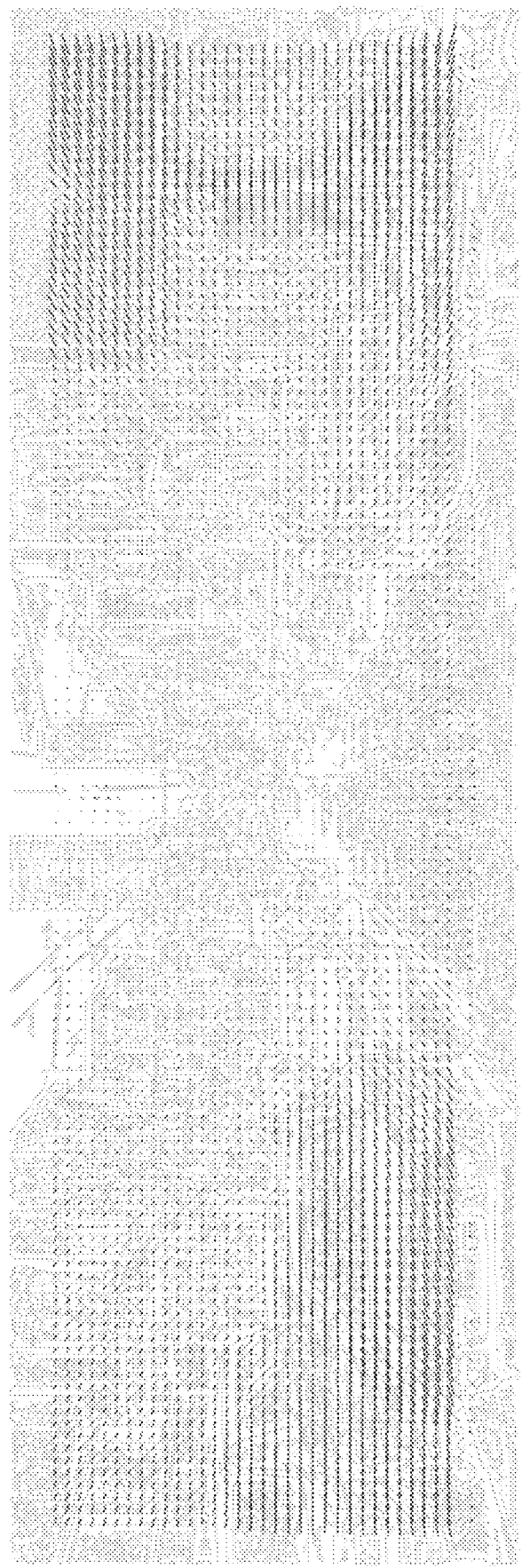
FIG. 18 illustrates a simulated application of a projective contour grid to an image according to some aspects of the present disclosure.
Figure 19:
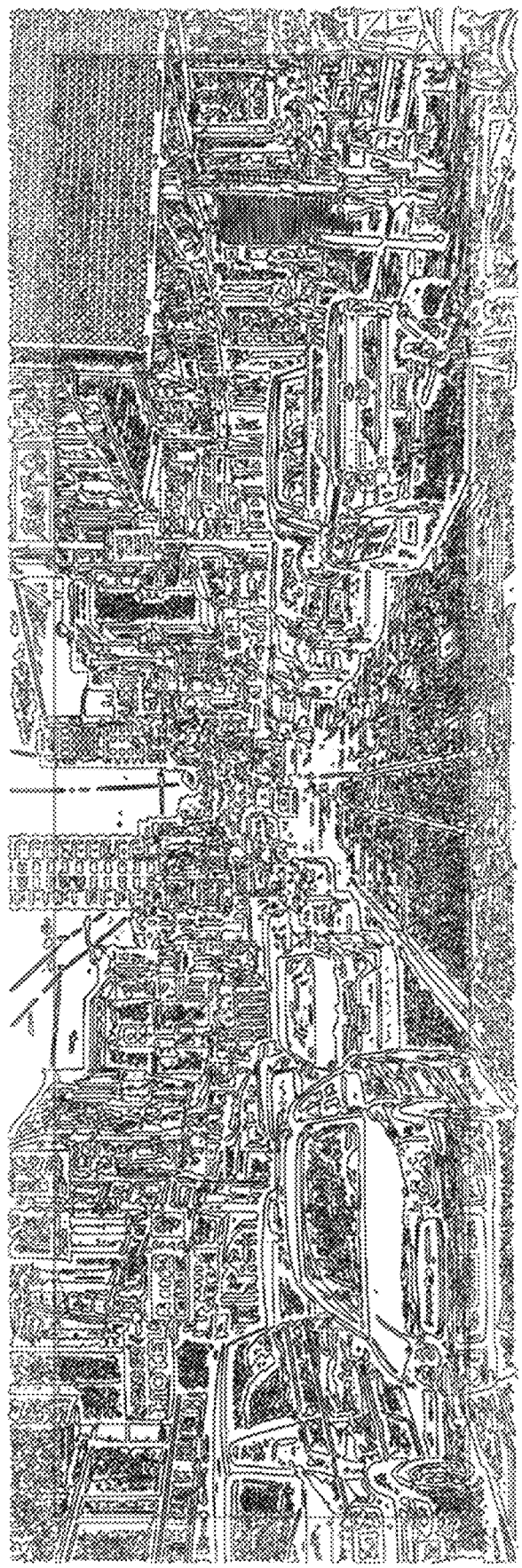
FIG. 19 illustrates a simulated sample of the results of a projective contour process according to some aspects of the present disclosure.

Continuing with the example of FIG. 3, projective contour matcher logic 316 may be configured to generate an image velocity for each pixel in the image received from affine contour matcher logic 314. Projective contour matcher logic 316 may further output a remapped image 322 as shown in the figure, wherein the remapped image may include a warped next image B (e.g., 306) that is warped to match the current image A (e.g., 304). Alternatively or in addition, projective contour matcher logic 316 may output an image map 330, configured as an image including two-dimensional offsets for each pixel that is used to generate remapped image 322. FIG. 18 illustrates a simulated application of a projective contour grid to an image via projective contour matcher logic 316 according to some aspects of the present disclosure. FIG. 19 illustrates a simulated sample of the results of a projective contour process according to some aspects of the present disclosure.

An output of projective contour matcher logic 316 may further be provided to focus of expansion (FOE) extractor logic 318 that may be configured to extract a FOE from the image map provided from projective contour matcher logic 316 to generate relative pose 324 and time-to-collision (TTC) contour cloud 328. The relative pose 324 may be configured to include the instantaneous translational and angular velocity of the camera that expresses how the camera moves from a current image to the next image. In some examples, the TTC contour cloud 328 may be configured as tracked contours with TTC added to applicable contour points. The output of FOE extractor logic 318 may be provided to contour tracker logic 320 that may utilize the image map and FOE to project contours of the current image into a next image, where the contour points provided by contour extractor logics 308, 310 of the current image are matched to the corresponding contour points on the next image. The contour tracker logic 320 may output contour tracks 326, which may be configured as contour points (e.g., extracted from 308, 310) of a current image linked with corresponding contour points of the next image.

In some examples, the remapped image 322 may warp a next image B (e.g., 306) to match the current image A (e.g., 304) using the equation below:

$$dst(row, col) = src(map_{row}(row, col), map_{col}(row, col))$$

where:
dst represents the remapped image 322,
src represents image B (e.g., 306),
map represents the image map 330, and
row, col represent projected points in the image Utilizing the configurations of FIG. 3, the sensor processor 302 may be configured to perform a number of processes to image data (e.g., 304, 306) to improve object recognition and tracking. For example, the sensor processor 302 may be configured to accurately track any object that enters a video until it is occluded or leaves the field-of-view. In other examples, the sensor processor 302 may be configured to get robust and accurate estimates of the TTC to static and parallel dynamic objects in the scene, as well as detect non-parallel dynamic objects (e.g., 214, 216) in the scene. The sensor processor 302 may further be configured to generate an estimate for the speed of the camera, where the TTC cloud can be converted into a depth map similar to LiDAR. This enables a more expensive LiDAR to be replaced by a less costly camera, as well as enable additional use cases that require a LiDAR. Similarly, the sensor processor 302 may be configured to compute a time of intercept for cross traffic and pedestrians in a cross walk, and accurately compute an instantaneous camera velocity and use this to perform internal integration to get a more accurate 3D representation of the environment. Additionally, the sensor processor system 300 may be configured such that a generated image map 330 will enable the FOE extractor logic 318 to compute a relative pose 324 with enough accuracy to generate accurate TTC contour clouds 328 for objects in the scene (e.g., see FIG. 2) utilizing only image/optical flow. The image map 330 provides a robust estimate of the image flow between a current and next image that can be used to accurately identify and track objects in a scene. The image map 330 may be processed for accuracy by mapping back to the image data 304, 306 to generate a remapped image 322 that may be compared directly pixel-for-pixel.

Such configurations enable a mono camera to generate a robust and accurate TTC cloud 328 from two images (304, 306), and can be used in place of more expensive 3D sensors such as LIDAR and RADAR, and further obviates the need for sensor fusion algorithms. Additionally, machine learning algorithms are not necessary to estimate the depths of objects in the scene (FIG. 2) using a single image. In some examples, the present disclosure not require training data and works for most scenes captured by a camera. Moreover, generation of a TTC contour cloud 328 does not require the camera to be accurately calibrated or precisely mounted to the vehicle, which advantageously reduces manufacturing cost and maintenance cost of keeping the system calibrated, and further does not require the use of stereo cameras.

As described in greater detail below, the FOE extractor logic 318 may be configured to generate an accurate, precise, and robust estimate of the camera's instantaneous translational and angular velocity (or relative pose 324). The robustness and accuracy of the generated image map 330, as well as the contour structure and noise characteristics, provide a very accurate estimate of relative pose. Not only does this enable the TTC contour cloud 328 to be accurate, but it can replace or augment an inertial measurement unit (IMU) sensor system in a vehicle.

In some examples, an image map 330 may be configured to be more than 80% sparse, in which only portions-of-interest may be provided for the TTC contour cloud 328, via contours of objects and the boundaries between objects in the scene (FIG. 2). Such a configuration would significantly increase processing efficiency on hardware capable of sparse computing. Alternately or in addition, representing image velocity as contours may enable contour tracker logic 320 to more efficiently track points in a scene (FIG. 2) to be reliably tracked while within the field-of-view of the camera.

Utilizing image map 330, relative pose 324, and TTC contour cloud 328, non-parallel dynamic objects may be readily detected in a scene (214). As explained bellow, image map 330 may be configured as the measured image velocities of objects in the scene. Using FOE extractor logic 318, the image map 330 may be computed, assuming all of the objects are static (i.e. stationary to the ground). Thus, for a current and next image, these two images will match for all static objects and rigid dynamic objects (e.g., 212 and 210) moving parallel to an ego vehicle 206. Image portions that do not match indicates objects are present that are either non-rigid objects (pedestrian 216) and/or a dynamic object, not moving in a parallel direction (e.g., car 214). For rigid dynamic objects, such as 212 and 210 conventional TTC techniques cannot typically determine the depth of such objects. However, under the present disclosure, the resulting TTC contour cloud 328 may be utilized to estimate depth measurements. For rigid static objects, if the speed of an ego vehicle 206 is measured and/or determined, depth may be computed with relative accuracy.

The advanced tracking provided by contour tracker 320 enables advanced compression streams for sending data to a network cloud in real-time with minimum bandwidth. Since each point in the scene is being tracked, any static object (e.g., 202, 204, 208, 218, and 220) only needs to be sent once initially. From then on, the network cloud can compute their positions using only the relative pose 324. In some examples, the shape of the object would only be updated to the cloud whenever the appearance changes (e.g., light turned on or off such as a traffic light, the object has moved closer to the car and is now larger having more detail).

The present disclosure has the potential to substantially reduce the cost of training traditional machine learning algorithms. By separating the incoming video images from the camera into streams of contours, indicating the objects in the scene (FIG. 2), the processing overhead may be significantly reduced. In some examples, machine learning tasks may be used on the contours instead of entire images, which obviates the need for training data and inference computing on an image object that may be computed directly and deterministically under the present disclosure. In general, the present disclosure provides an efficient front-end-to-transformer-based machine learning model. Currently transformers have a quadratic compute cost based on the number of inputs. Typical transformer algorithms sub-divide an image into non-overlapping image patches, and the videos into non-overlay blocks of space-time. In contrast, the present disclosure decomposes the video into object streams which greatly reduces the number of inputs. Accordingly, existing machine learning models, including transformers, may be configured to be more efficient by providing 3D and TTC context within a 3D neighborhood of the object. Objects in a scene, and location history, may be accurately and robustly determined within the field-of-view of the camera. In some examples, a 3D representation of an environment (FIG. 2) may be generated by a single camera by using relative pose 324 to integrate all of the TTC contour clouds 328 into an inertial 3D space. Object locations and tracking in a scene (FIG. 2) may be determined using hardcoded deterministic algorithms as described by this invention. Rigid (e.g., 214), non-rigid (e.g., 216), static (e.g., 202, 204, 218, 208) and/or parallel (e.g., 212 and 210) objects may each be detected and a TTC contour cloud 328 may be estimated for each under the present disclosure. The object tracking of the present disclosure advantageously does not rely on the identification of an object, but rather identifies an image characteristic of the object (e.g., rigid non-rigid, etc.) within a scene so that machine learning and other aspects of the perception may provide functionality to avoid collision with the object. In some examples, contour tracks 326 may be used to supplement/improve labeling of training data by tracking back in time to show a machine learning models all poses of its appearance and its relationship to other objects.

Figure 4:
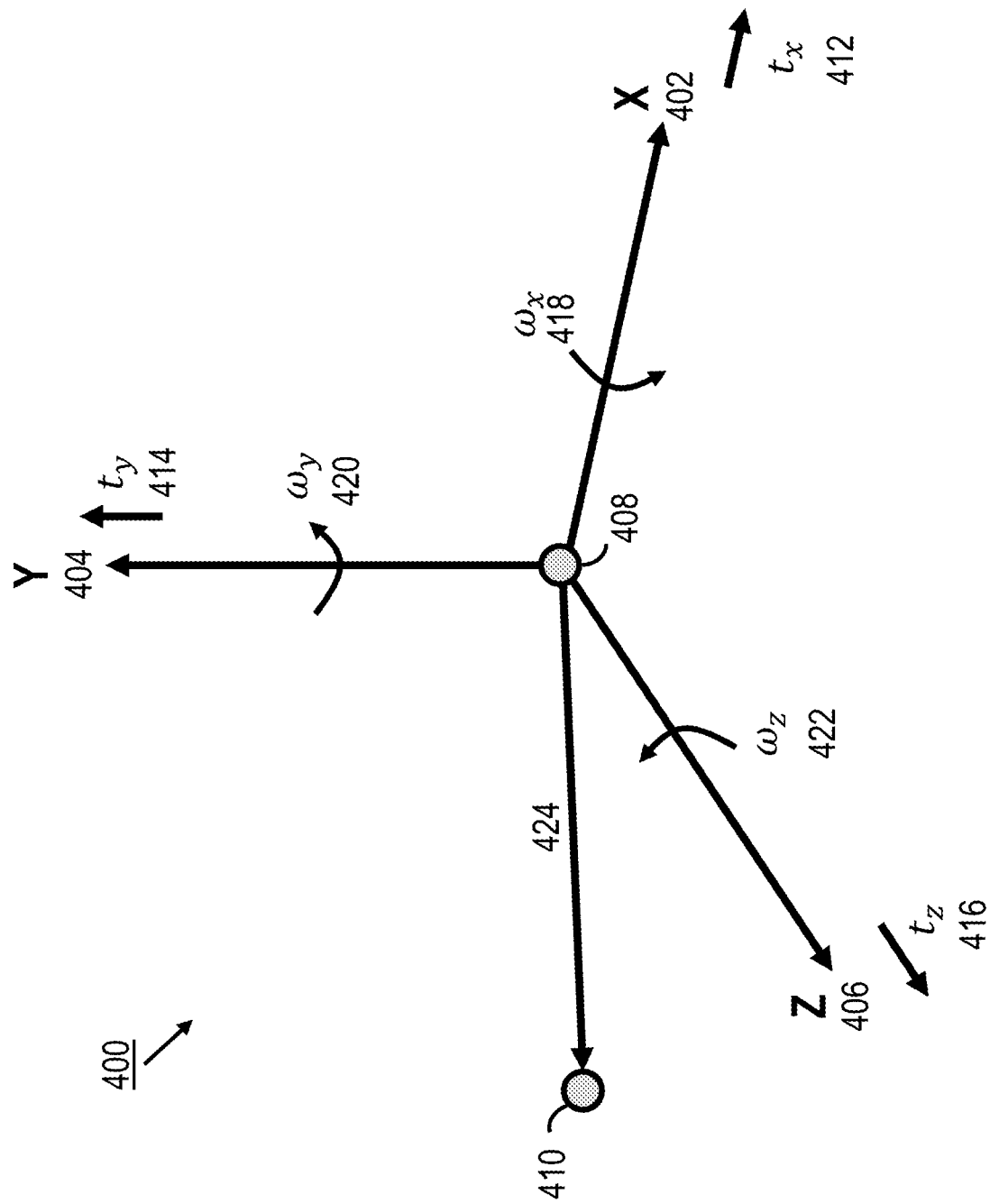
FIG. 4 illustrates an example of instantaneous translational and angular velocity of a camera as it moves from the current frame to the next frame according to some aspects of the present disclosure.

FIG. 4 illustrates an example of instantaneous translational and angular velocity of a camera as it moves from the current image to the next image according to some aspects of the present disclosure. In this example, a camera coordinate system 400 is shown with origin point (or focal point) 408 and X axis 402, Y axis 404, and Z axis 406. The Z axis 406 may be thought of as a principle axis and may be configured to be perpendicular to the image plane and passing though the focal point 408. Light rays 424 reflected from a point in the scene 410 may enter the image sensor (e.g., front facing camera mounted to an ego vehicle) at a specific pitch and azimuth angle which may be expressed as projected point (row, col) in the image, where the ego vehicle is either moving or is stationary. In some examples, if the vehicle is moving, the camera may experience pitch, azimuth, and twist variations due to an uneven road surface and/or maneuvers undertaken by the vehicle. This will typically cause the camera to move. In some examples, the amount of camera movement between a current image and a next image may be processed as an instantaneous translational and angular velocity. The instantaneous translational velocity may be defined as $t_x$ 412 along the x-axis, $t_y$ 414 along the y-axis, and $t_z$ 416 along the z-axis. The instantaneous angular velocity may be defined as $\omega_x$ 418 about the x-axis, $\omega_y$ 420 about the y-axis, and $\omega_z$ 422 about the z-axis.

Figure 5:
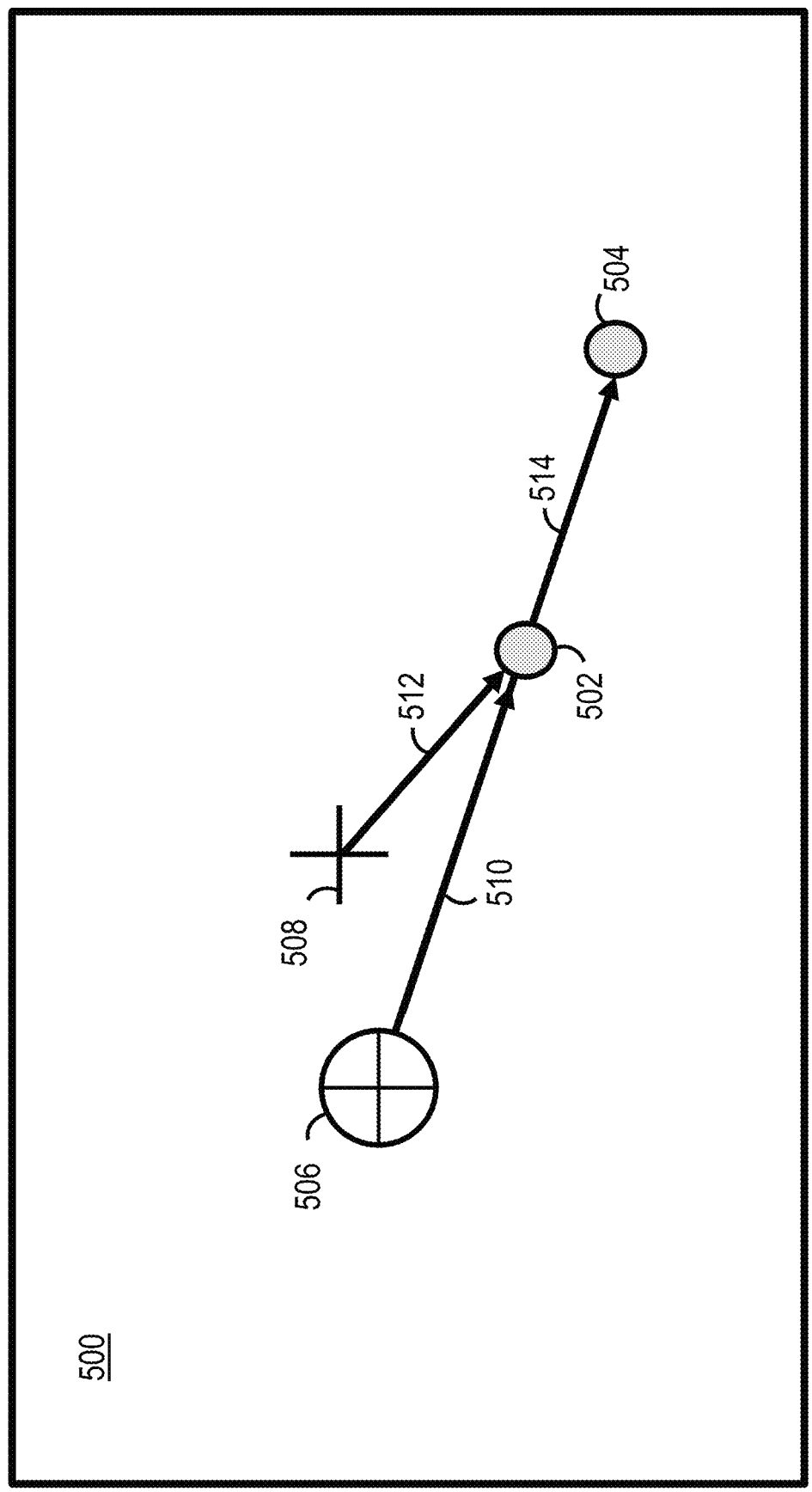
FIG. 5 illustrates an example of the effect of the instantaneous camera movement on scene points projected on to the image plane of a camera according to some aspects of the present disclosure.

FIG. 5 illustrates an example of the effect of the instantaneous camera movement on scene points projected on to the image plane of a sensor (e.g., camera) according to some aspects of the present disclosure. Image point 502 is illustrated as the location of the projected scene point on the image plane 500 for a current image A (e.g., 304), whereas image point 504 is illustrated as the location of the same projected scene point on the image plane 500 for the next image B (e.g., 306). Position vector 512 indicates the position of image point 502 from the optical center 508 of the camera, and radial vector 510 indicates the position of image point 502 relative to the FOE 506. In this example, the movement 514 of the image point from point 502 to 504 is caused by the movement of the camera as defined by its instantaneous velocity. Movement 514 may therefore be processed as the image velocity of image point 502.

Components of the image velocity 514 ($u_i$, $v_i$) at an $i^{th}$ scene point may be determined by $$u_i = \rho_i(t_x - x_i t_z) - x_i y_i \omega_x + (1 + x_i^2)\omega_y - y_i \omega_z$$

$$v_i = \rho_i(t_y - y_i t_z) - (1 + y_i^2)\omega_x + x_i y_i \omega_y + x_i \omega_z$$

where:
- $t_x$, $t_y$, $t_z$ represent the instantaneous translational velocity of the camera,
- $\omega_x$, $\omega_y$, $\omega_z$ represent the instantaneous angular velocity of the camera,
- $x_i$, $y_i$ represent the components of the position vector (512) for the $i^{th}$ scene point,
- $u_i$, $v_i$—are the components of the image velocity (514) for the $i^{th}$ scene point, and
- $p_i$—the inverse pseudo depth for the $i^{th}$ scene point.

The focus-of-expansion (FOE) 506 may be computed from:

$$foe_x = \frac{t_x}{t_z} * focal + center_x$$

$$foe_y = \frac{t_y}{t_z} * focal + center_y$$

where:
- $t_x$, $t_y$, $t_z$ represent instantaneous translational velocity of the camera
- focal represents the focal length of the camera (e.g., distance from focal point to the image plane), and
- center represents the location of the principle point in the image.

In some examples, the Time-to-Collision (TTC) of a scene point can be computed by the equation below, particularly if the scene point belongs to a static object or an object traveling parallel to the ego vehicle direction-of-travel:

$$ttc = \frac{R}{dr}$$

where:
- R represents magnitude of the radial vector 510
- dr represents magnitude of the image velocity vector 514, and
- ttc represents is the time-to-collision in image frames Accordingly, an inverse pseudo depth $p_i$ can be estimated using:

$$\rho_i = \frac{(t_x - x_i t_z)(-x_i y_i \omega_x + (1+x_i^2)\omega_y - y_i \omega_z x - u_i) + (t_y - y_i t_z)(-(1+x_i^2)\omega_x + x_i y_i \omega_y + x_i \omega_z - v_i)}{(t_x - x_i t_z)(t_x - x_i t_z) + (t_y - y_i t_z)(t_y - y_i t_z)}$$

As mentioned above, a vehicle image sensor (e.g., camera) typically experiences variation in pitch and azimuth as the vehicle travels down the road due to uneven road surface and/or turning maneuvers. In some examples, the frame contour matcher 312 may be configured to estimate the pitch and azimuth change between frames. As discussed herein, pitch and azimuth changes may be processed as instantaneous angular velocities $\omega_x$, $\omega_y$, and, in some examples, angular velocity $\omega_z$ (or "twist angle") may be assumed to be small or negligible.

Figure 6:
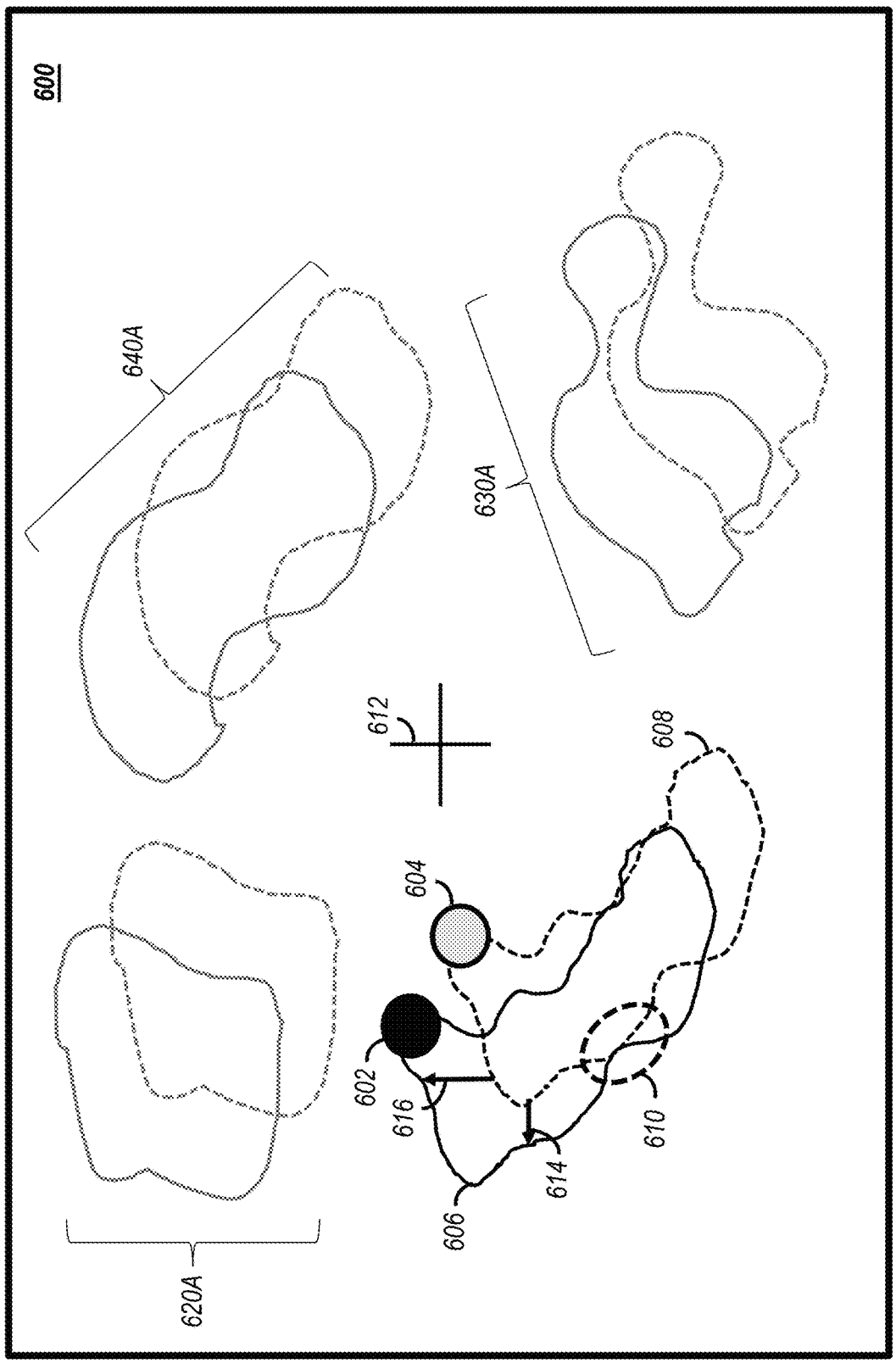
FIG. 6 shows a simulated example of contours of a current image before applying a frame contour matcher process according to some aspects of the present disclosure.
Figure 7:
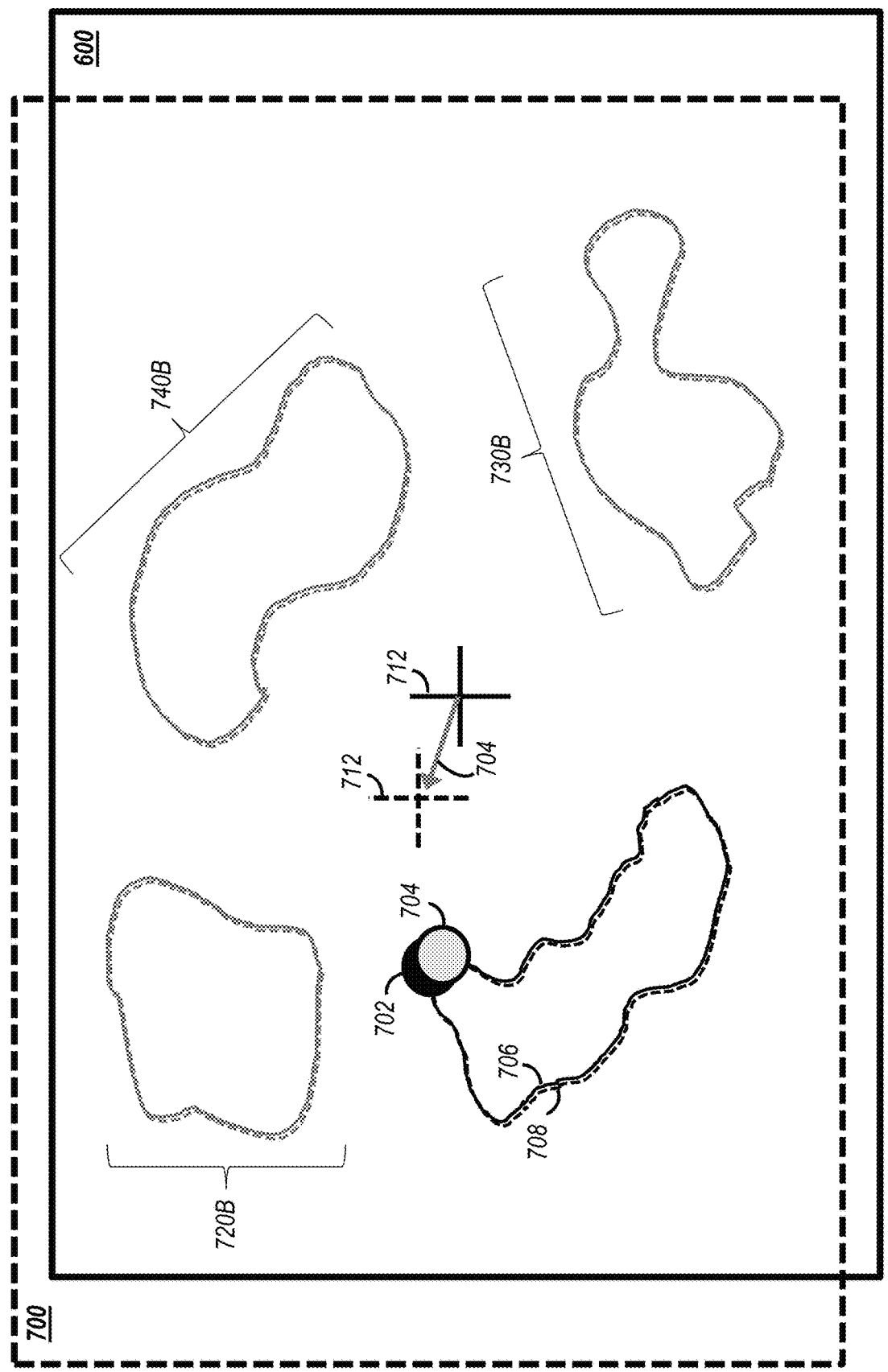
FIG. 7 shows a simulated example of contours of a next image after applying the frame contour matcher process according to some aspects of the present disclosure.

FIGS. 6-7 illustrate the operation of the frame contour matcher, where FIG. 6 shows a simulated example of contours of a current image before applying a frame contour matcher process (e.g., via 312) according to some aspects of the present disclosure. In this example, the current image 600 (e.g., 304) is obtained with an image center 612, where the current image 600 is processed, for example, using contour extractor logic 308, and a current image contour point 602 (or root) is detected of an associated contour 606. In this example, a next image (e.g., next image frame) is received, which includes a next image contour point 604 of a next image associated contour 608, shown as a dotted line in the figure. Other contours, such as 620A, 630A and 640A having their own contour points (not shown) of a current and next image may also be processed simultaneously in the same image 600. During a contour matching process, points on a first contour of a current image (e.g., 606) are processed relative to a second contour (e.g., 608) of a next image to determine horizontal and vertical offsets or tethers.

In some examples, horizonal tethers are computed for each row of the image and vertical tethers are computed for each column of the image. Tether 614 is an example of a horizontal tether aligned on a row of the image and tether 616 is an example of a vertical tether aligned on a column of the image. The other horizontal and vertical tethers are not shown. Horizontal tether 614 (and the other horizontal tethers connecting contours 606 and 608, indicate the direction that contour 608 of the next image should be moved to match contour 606 of the current image. As the next image is translated in the direction indicated by the horizontal and vertical tethers, the average length of the tethers becomes smaller. When the length of a tether is within a predefine threshold (typical thresholds range from 0.5 to 2 pixels), the tether is considered an inlier or matched. As the frame contour matcher iterates, tether lengths become smaller and thus become inliers. A contour from the next frame is considered matched to a contour in the current frame if the majority of the horizonal and vertical tethers are matched or inliers. During the iterative process, some regions 610 appear to be matched even though contours do not match. These cases are ignored since the majority of the horizontal and the vertical tethers are not matching (inliers).

Under the present disclosure, small regions of zero local movement may be tracked through space and time within the image data generated by one or more sensors (e.g., 304, 306). As a result of this tracking, contours may be extracted for each image. In one example, the first frame (current image) included in the image data may be processed as an image having image contours. The image may also store an initial track point, which may be a point in the image data determined automatically, or as a result of a user tapping or pressing a location on a Graphical User Interface (GUI) displaying image data. Contours of each incoming image (next image) included in a plurality of frames included in video image data may be aligned to the image contours using tethers so as to enable the ability to track the object initially located at the initial point. A tether may be defined as a connection between roots of similar polarity on two different frames. Since roots for a particular orientation have a polarity, for orientation 0, from left to right, an intensity change in the blob image from negative to positive has a positive polarity and from positive to negative has a negative polarity. Likewise, for orientation 2, from top to bottom, an intensity change in the blob image from negative to positive has a positive polarity and from positive to negative has a negative polarity.

Thus, tethers can connect roots of contours from a current image to the nearest roots on contours of similar polarity in the image. Thereafter, a Gaussian weighted average of the tethers may be computed. Subsequently, the incoming image data may then be translated in the direction that minimizes the average tether length. Following that translation, the process operations for generating tethers and translating the image data may be performed on an iterative basis (i.e., repeated) until and acceptable error rate is generated. This approach has particular technical utility as a result of tracking zero local movement in space-time, which is significantly different than conventional approaches that use algorithms that track edges or intensities in space only. In particular, by tracking zero local movement in space-time, examples of the present disclosure do not require prior knowledge about the size or shape of an object. Additionally, disclosed examples can provide sub-pixel resolution and accuracy natively and directly based on the image data generated by one or more image sensors. Moreover, the disclosed embodiments do not require any training data in order to enable accurate and efficient operation, thereby increasing the robustness of image processing in a machine vision system. Moreover, this approach enables the ability to use higher frame rates results in simpler computations that can be executed on emerging silicon processing platforms such as GPU and AI chips.

For lateral tracking functionality, input image data (e.g., 304, 306) may be filtered using an affine root filter in affine contour matcher logic 314 to generate orientation 0 roots and orientation 2 roots. The orientation 0 roots for a current frame may be used to generate the orientation 0 root map; likewise, the orientation 2 roots for a current image may be used to generate the orientation 2 root map. Additionally, the orientation 0 roots for images after the current image are used to generate orientation 0 tethers 435; likewise, the orientation 2 roots for images after the current image are used to generate the orientation 2 tethers. Thereafter, weighted averaging may be performed to generate a delta, and the process may be repeated by iterating the results.

Using the different polarities of the tethers, different orientations, such as orientation 0 and 2, may be applied to next image and a current image. As the tethers have different polarities, positive tethers may be configured for orientation 0 roots and negative tethers may be configured for orientation 0 roots under one example. Similarly, positive tethers may be configured for orientation 2 roots and negative tethers may be configured for orientation 0 roots. The map may be configured to store an initial track point so as to enable the ability to track the object initially located at that point in subsequent frames of image data. In some examples, Gaussian weights (or other weights, such as Gabor weights) may be applied to the tethers around an initial (centering) point.

Accordingly, image data may be processed to extract contours which may then be aligned to enable centering of the images about a point on the object so as to register the images in an image sequence with one another in association with a tracking point. A contour may be processed as a set of roots that form a boundary between two blobs in an image. Under some examples, by extracting the contours from each incoming image and comparing them with the contours of the map frame, tethers are generated for the contours of each incoming frame. In some examples, the length of these tethers may be aggregated using a large Gabor filter to provide a measurement that indicates change of scale. A Gabor filter performs modulation of a directed sine plane wave and a circular 2D Gaussian function. Thus, such a Gabor filter may be constructed, for example, by modulating a two-dimensional Gaussian filter with an in-phase, two-dimensional sinusoidal wave in two or more orientations. The output of such a Gabor filter may be inversely proportional to scale change while being insensitive to (i.e., not being sensitive to or affected) to translation misalignment. Examples disclosed herein provide additional technical utility because they provide the ability to detect relative changes in the size of an object in an image without knowing the size in the first place.

Moreover, as a result of this relationship, image data included in a current image may be resampled to increase or decrease the resolution to be slightly larger or smaller to drive the Gabor filter output to zero. This enables object scaling to be performed so as to align edges of the object so that the object in the image data is maintained the same size from image to image. Moreover, because the depth of the object (distance to the object) is inversely proportional to its scale change, this data may be used to determine distance to the object and/or changes in distance to control assistive/autonomous driving functionality of a transportation vehicle, as discussed herein. As with the other disclosed embodiments, use of the roots for different orientations enables a robust and simplistic machine vision system that does not require machine learning to identify and track objects. Moreover, because of the simplistic nature of the implementation, the functionality may be implemented using a GPU and may be optimized for an AI chip implementation, if necessary.

As will be described in greater detail below, under some examples, when utilizing a frame contour matcher (e.g., 312), circular regions centered about the image center or optical center may be configured, with a diameter substantially equal to the height of the image. A Gaussian filter may be used to highlight contours closer to the center. Due to the inlier operation discussed herein, matching may be focused on contours that have not changed size, as this would indicate object movement from the current frame to the next frame. Accordingly, matching may be focused on the contours representing large distances in front of the camera near the horizon. As a vehicle (e.g., 206) moves forward, contours of objects near to the camera and the camera should get larger, as they move from the current frame to the next frame. Thus, even though the average tether lengths will tend to be small, they may not be within the threshold to be considered inliers.

FIG. 7 shows a simulated example of contours of a translated image 700 after applying the frame contour matcher process according to some aspects of the present disclosure. Here, the current image 600 of FIG. 6 is translated to an image position 700, such that the next image contour point 702 (root) and associated next image contour 708 (shown as 604 and 608 in FIG. 6) are substantially matched with the current image contour point 702 and associated current image contour 706 (shown as 602 and 606 in FIG. 6, where the level of matching may be determined by a tunable parameter, such as 0.5 pixels. As can be seen in the figure, the frame contour matcher 312 translates the next image such that contours from the next image substantially match contours from the current image. Additionally, as a result of the translation, optical center 712 is moved to optical center location 712 in the next frame 700, relative to the offset required to match the contours. Frame offset vector 704 may be determined as the amount of the translation computed by the frame contour matcher 312 to effectuate the match. As a result of the contour alignment and matching, pitch and azimuth movement between the current and the next frame is minimized, thus removing substantive effects of the instantaneous angular velocity of the camera. Accordingly, a FOE may be calculated using instantaneous translational velocity (e.g., $t_x$, $t_y$, $t_z$).

Thus, in summary, the current image 600 (or frame) can be processed as an image plane of a camera, having a determined optical center 612 in the frame. The next image 700 (or frame) may be translated so that the image contours of the next image (608, 708) match the image contours of the current image (606, 706). As a result of the matching, the root or image contour point 604 (704) will match root or image contour point 602 (702), along with each of the other contour points of their respective contours, within a configured tolerance (e.g., 0.5 pixels).

In the examples of FIGS. 6-7, horizontal orientation 0 tethers 614 along contour rows of the image, and vertical orientation 2 tethers 616 along contour columns of the image are processed via frame contour matcher logic 312 to "pull" contour 608 (708) towards contour 606 (706) in the direction shown by the arrows in the figure. It should be understood that, while only singular arrows (614, 616) are depicted in the simplified figure, they generally represent multiple arrows that are associated with respective individual points on each contour. For adjacent or already-overlapping areas, such as area 610, correspondence between the contours may be registered, and may be ignored in some examples. As contour 608 moves close to contour 606 iteratively, the tethers (e.g., 614, 616) get smaller until the two contours overlap.

One of the advantages of utilizing contours for computer vision in such applications is that contours are typically deterministically random, where there is substantially one way in which two contours from successive images or frames could match each other. Another advantage of using the frame matching under the present disclosure is that contour matching may be configured to be performed on all of the contours in an image of a vehicle camera, such that contours along a focus of expansion can be more accurately matched, since contours in a foreground would appear larger than those in a background.

Figure 8B:
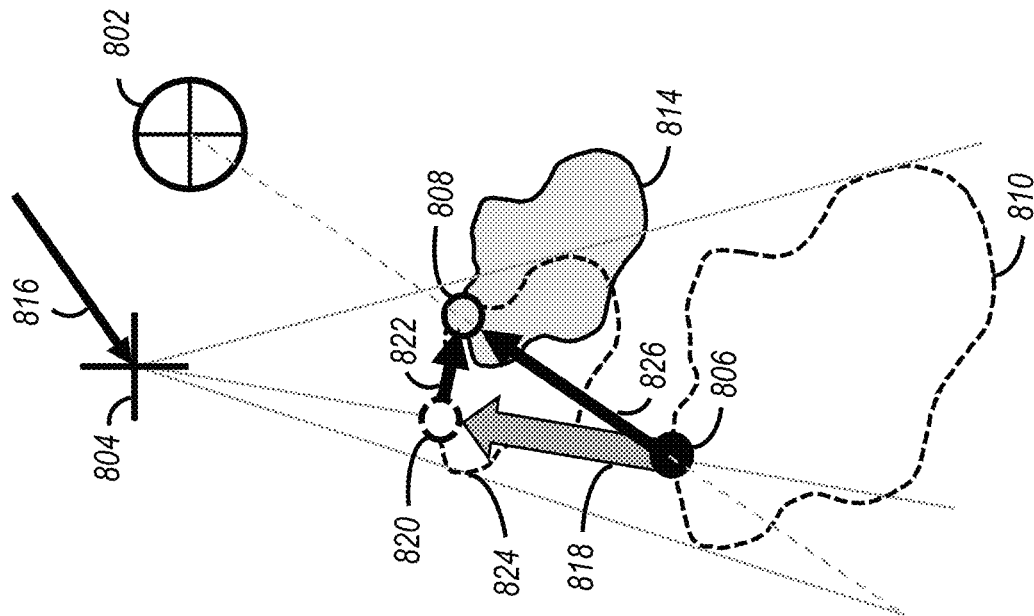
Figure 8A:
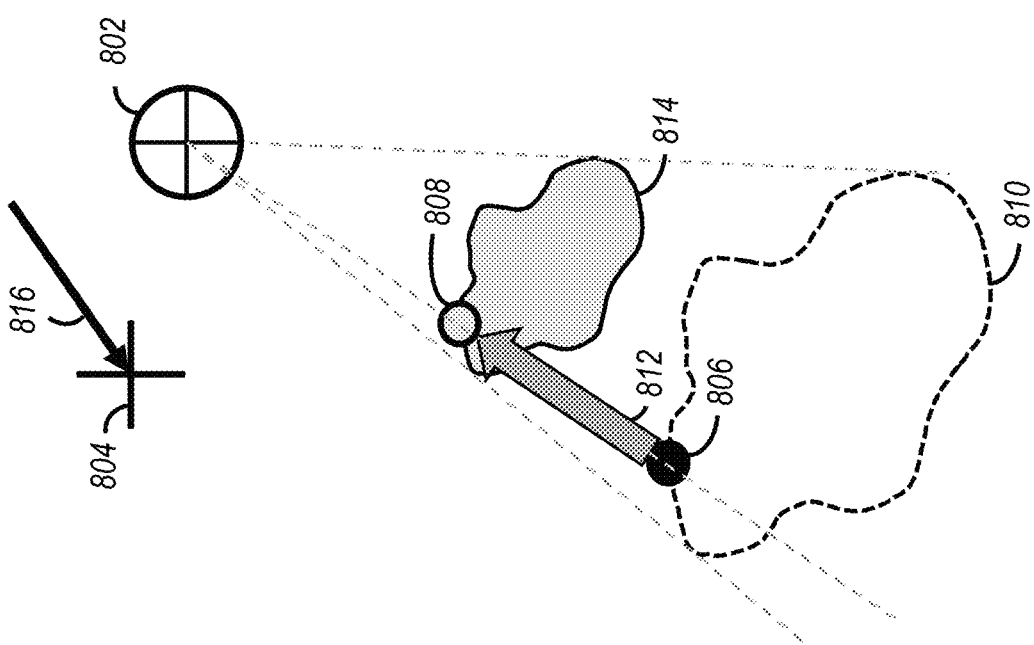

FIGS. 8A-8C illustrate an operation of an affine contour matching process on a single image point according to some aspects of the present disclosure. Turning to FIG. 8A, a current image and next image configuration, similar to those discussed above, is shown, where a scene captured by an image sensor includes a FOE point 802 and an image center 804. In this example, FOE point 802 is known, and contour point 806 of contour 810 may be processed to scale contour point 806 of contour 810 inwards to contour point 808 of contour 814 of the current image, as is shown in the figure. The scaling may be based on the known FOE 802, illustrated as dotted lines in the figure, and may be performed such that the contour 810 substantially matches the scaled contour 814 of the current image, using scale vector 812, representing the scale factor.

FIG. 8B illustrates an example where the FOE 802 location may not be available, and would thus need to be computed. In this example, contour point 806 of contour 810 may be scaled inward relative to the image center 804 (scaling shown in shaded lines in the figure) using scale vector 818 to determine scaled contour point 820 of contour 824 of the current image. To determine the offset 822 of contour point 820 of contour 824 relative to contour point 808 of contour 814 (i.e., the scaled contour relative to the FOE), the contour 824 is aligned using tethers to substantially match contour 814. As a result of the affine contour matching, the image velocity 826 may be computed by adding the frame offset vector 816, which may be obtained from the frame contour matching process, together with the scale vector 818, and the offset vector 822. This results in in the substantial matching and scaling of contour point 806 of contour 81 inwards to contour point 808 of contour 814 of a next image as shown in FIG. 8C.

In the example of FIG. 8B, it should be understood that image velocity vector 826 represents the movement of contour point 806 on the next image to contour point 808 on the current frame. The direction of image velocity 826 may be reversed to determine the opposite movement of contour point 808 on the current frame to contour point 806 on the next frame. For the remainder of this disclosure, the latter convention will be used. As contours normally change their structure as the image is scaled, the processes described above may reduce and/or minimize artifacts with contours. In some examples, the image is scaled first, before extracting the contours.

In some examples, the affine contour matcher (e.g., 314) may be configured such that smaller, scaled versions of images may be used, where the circular region may range, e.g., from 64 to 256 pixels. Scaling of the image may be performed over various scales, where the next image may be scaled (resized) to be progressively smaller. This way, a matching scale may be determined so that contours of objects nearer to the camera can be matched in addition to contours of objects in the far distance. Compared to the output of the frame contour matcher (e.g., 312), which may include a single translational offset $d_x$, $d_y$ or $\omega_x$, $\omega_y$, the output of the affine contour matcher may be configured as a translational offset and a scale for each grid point, as explained herein.

Figure 9:
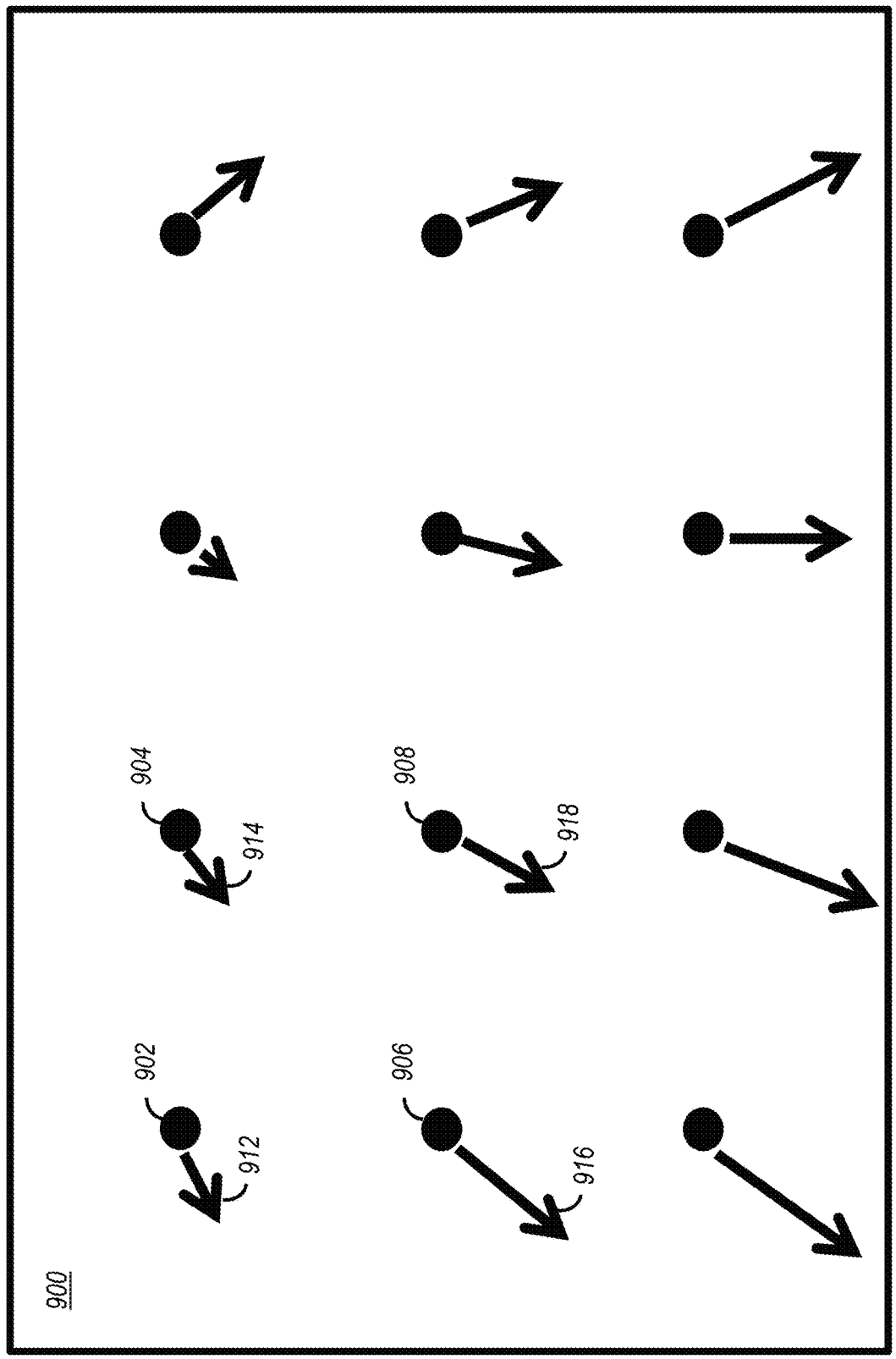
FIG. 9 illustrates a simplified layout of an affine contour matching grid according to some aspects of the present disclosure.

FIG. 9 illustrates a simplified layout of an affine contour matching grid according to some aspects of the present disclosure. As explained above, the output of frame contour matching logic 312, which may be configured as an image map, may be transmitted to affine contour matcher logic 314 that may be configured to estimate image velocity for a coarse grid of points across the image using affine transformation. The grid of image velocities may then be used to initialize a finer projective contour grid in projective contour matcher logic 316. In the example of FIG. 9, a current image 900 is illustrated, that includes a plurality of grid points 902, 904, 906 and 908, where respective image velocities 912, 914, 916 and 918 are determined for each of the points. Thus, in some examples (e.g., FIGS. 8A-8C) the image velocity for a single specific point in the image may be calculated. In some examples, the affine contour matcher logic 314 may perform these operations on a group of points arrange in a grid, as shown in FIG. 9, where grid points (902-908) are overlaid onto a current image (900), and image velocities for each grid point (912-918) are plotted.

Figure 10:
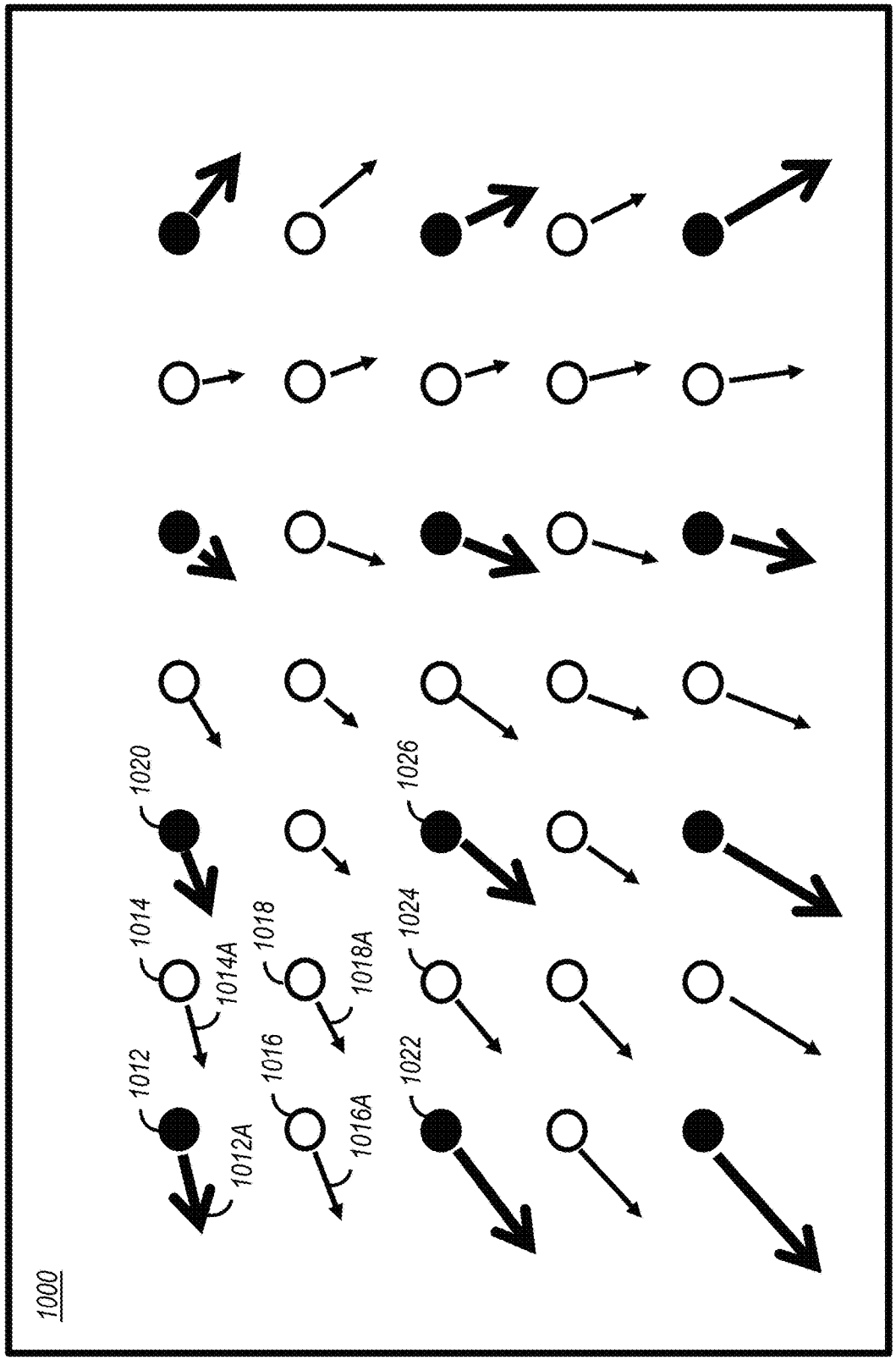
FIG. 10 illustrates how a coarser affine contour grid may be used to initialize a finer projective contour grid according to some aspects of the present disclosure.

FIG. 10 illustrates how a coarser affine contour grid may be used to initialize a finer projective contour grid according to some aspects of the present disclosure. As explained above, projective contour matcher logic 316 may be configured to generate an image velocity for each pixel in the image received from affine contour matcher logic 314. In the example of FIG. 10, a projective contour matching process may be configured to operate on a finer grid than an affine contour grid, such as the one illustrated in FIG. 9. FIG. 10 shows a current image 1000 that may include the coarser affine contour grid points 1012 overlaid on a finer projective contour grid that may include a plurality of surrounding projective contour grid points 1014, 1016, 1018. Based on each image velocity vector (e.g., 1012) of coarser affine contour grid points, these image velocity vectors may be interpolated to generate image velocity vectors 1014A, 1016A, 1018A of the projective grid of current image 1000. In some examples, bilinear interpolation may be used, where point 1016 may represent an interpolation between points 1012 and 1022, point 1014 may represent an interpolation between points 1020 and 1012, point 1024 may represent an interpolation between points 1026 and 1022, and point 1018 may represent an interpolation between points 1024 and 1014. The vectors illustrated in the figure may be calculated as an average magnitude and angle between vectors. Thus, vector 1016A may represent the average magnitude and angle between vectors 1012 and 1022. Of course, those skilled in the art will understand that other interpolation techniques are contemplated in the present disclosure.

Figure 11:
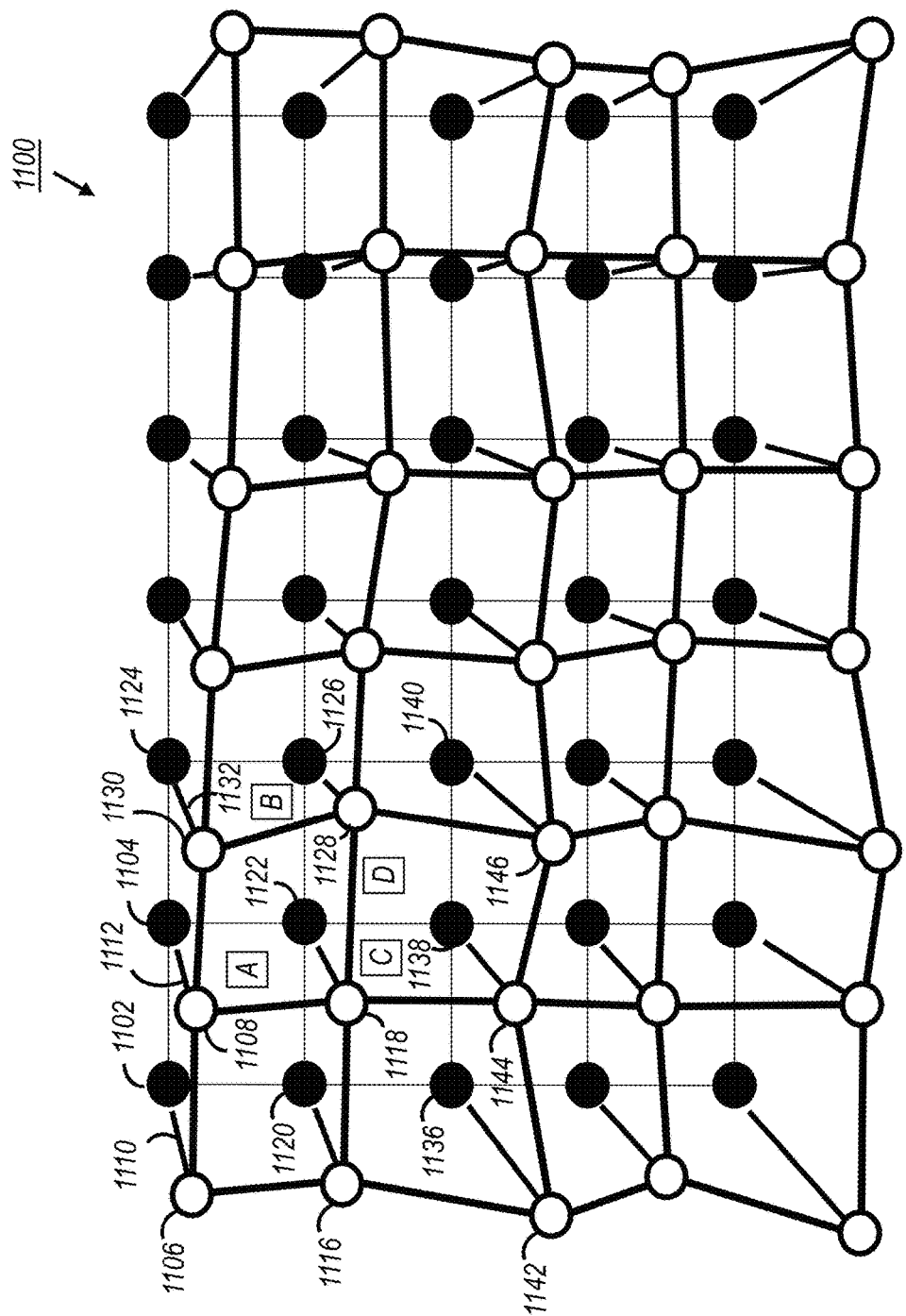
FIG. 11 illustrates an operation of a projective contour matching according to some aspects of the present disclosure.

FIG. 11 illustrates an operation of a projective contour matching 1100 according to some aspects of the present disclosure. In this example, projective contour matcher logic 316 may be configured to process grid points 1106, 1108 from next image and match them to image points 1102, 1104 of a current frame in which the next image points (1106, 1108) have moved to. Grid point 1102 may be configured as being on a pixel boundary. Image velocity vectors 1110, 1112 may be calculated based on a mapping offset for grid points 1102, 1104. The image velocities 1110, 1112 for the pixels in each grid square may be interpolated using projective transformation. The resulting map image may then be used to warp a next frame (e.g., including points 1106, 1108) to match the current frame (e.g., points 1102, 1104). Contours may then be extracted for the warped frame. Contour alignment may then be performed at each grid points 1102, 1104 to make small adjustments to grid points 1106, 1108. This process may be subjected to multiple iterations until an acceptable residual is obtained.

Thus, under some examples, grid centers 1106, 1108, 1130, 1116, 1118, 1128, 1142, 1144, and 1146 are moved iteratively (gradually) from the next image and towards their corresponding grid points in the current image 1102, 1104, 1124, 1120, 1122, 1126, 1136, 1138, and 1140 respectively. The grid center point 1106 of the next image may be configured represent a point where the grid center point 1102 of the current image moved to. In order to determine the overall matching, the grid points are warped from the perspective of the next image, relative to the current image, where each of the points came from. Under some examples, projective warping, or other suitable warping may be used. Under projective warping, the parameters of transformation between pairs of images may be used to warp images into alignment. In some examples, the transformation may be based on a homography of a configured matrix size having configured degrees of freedom.

In the example of FIG. 11, grid center 1122 is configured at the corner of grid squares A (defined by points 1102, 1104, 1120 and 1122), B (defined by points 1104, 1124, 1122 and 1126), C (defined by points 1120, 1122, 1136 and 1138), and D (defined by points 1122, 1126, 1138 and 1140). As the other corners of these grid squares move from the current frame to the next frame, they tend to from quadrilaterals. By using projective warping, the image defined by each quadrilateral (e.g., 1106, 1108, 1116, and 1118) can be processed so that they match each other (e.g., quadrilateral defined by 1102, 1104, 1120, and 1122). As the quadrilaterals are warped, the contours are recomputed as they converge. Tether matching is iteratively used on the contours, and a smaller matching radius is applied, centered about each grid point (e.g., 1122). The process continues to be iteratively applied until convergence (matching) is detected. The convergence may be configured as a tunable parameter, and may be based on a number of inlier tethers (e.g., tethers with magnitude less than 0.5 pixels; does not increase by more than 10%, etc.). Numerous other stopping criteria could be used. In some examples, convergence processing may be configured to iteratively execute for a predetermined number of iterations.

In some examples, the projective contour matcher (e.g., 316) may be configured such that an image and associated pixel grid may be configured as a plurality of geometric shapes (e.g., grid squares). The geometric shapes surrounding a next image of a current image grid center point (e.g., 1122) may be processed to protectively warp the geometric shapes onto the corresponding geometric shapes of the current image (e.g., grid squares A-D). The matching process may be configured such that a scaled (smaller) version of the image may be used to compute the resulting average horizontal and vertical tethers, indicating how grid points in the next image should be moved to match their corresponding positions in the current frame for the next iteration. This process may be simultaneously performed for all of the grid points as each iteration is executed. The circular radius may be similar in size to the one used in the affine contour matcher (316).

Figure 12:
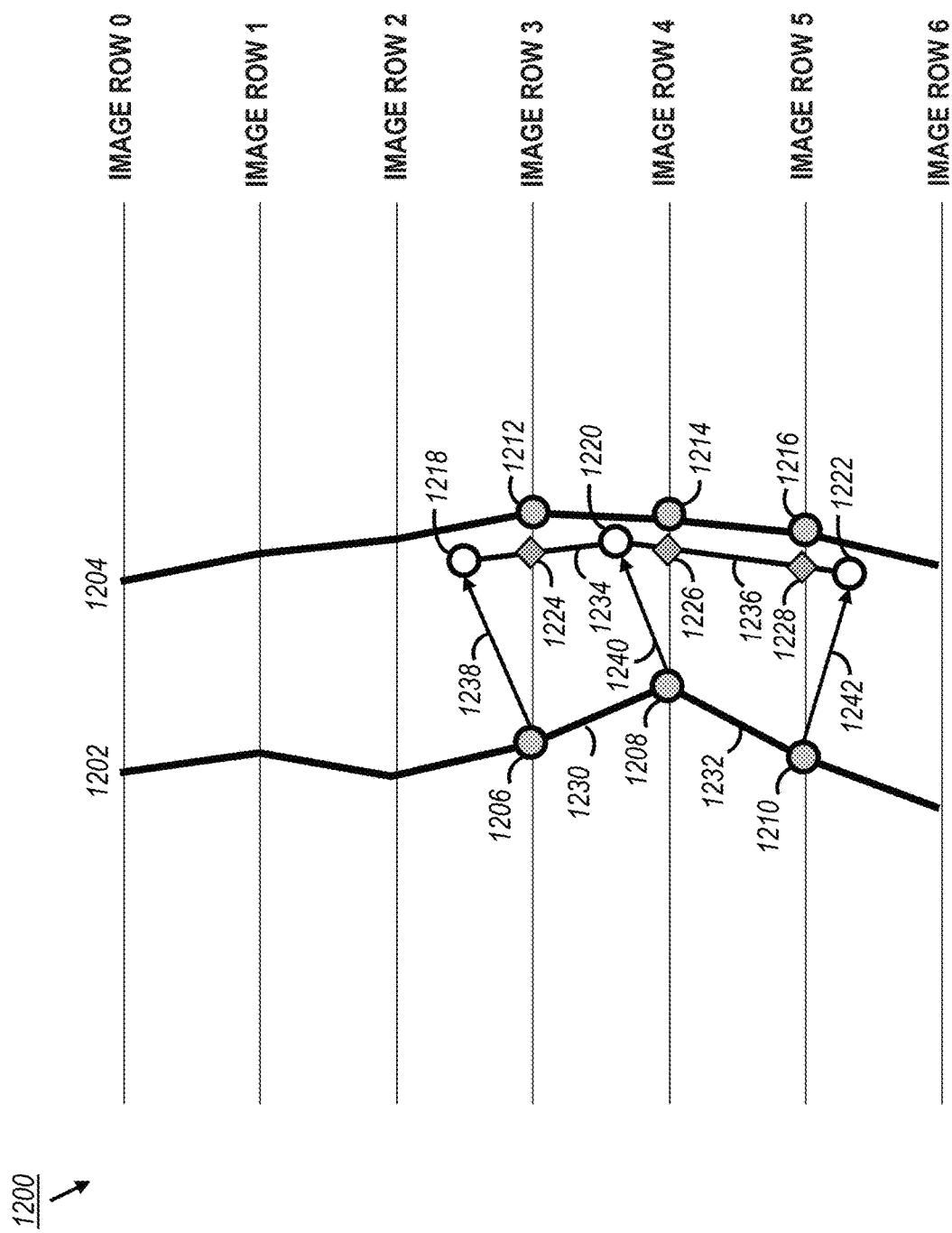
FIG. 12 illustrates an operation for a contour tracking process according to some aspects of the present disclosure.

FIG. 12 illustrates an operation for a contour tracking process 1200 according to some aspects of the present disclosure. In this example, contour 1202 from the current frame (e.g., similar to contour 606) is tracked to corresponding contour 1204 of the next frame (e.g., similar to contour 608) along a plurality of image row boundaries (IMAGE ROW 0-IMAGE ROW 6). Contour points 1206, 1208 and 1210 are configured on row boundaries IMAGE ROWS 3-5, respectively (for orientation 0 and on column boundaries for orientation 2), and are connected together with edges, were edge 1230 links contour points 1206 and 1208, and edge 1232 links contour points 1208 and 1210. Image velocity vectors 1238, 1240 and 1242 are determined for projecting contour points 1206, 1208 and 1210 into a future point from a current frame to a next frame to corresponding locations 1218, 1220 and 1222.

Next frame contour points 1218, 1220 and 1222 may then form edges 1234 and 1236. Edges 1234 and 1236 may then be utilized to move contour points 1218, 1220 and 1222 from their existing positions to a position 1224, 1226 and 1228 relative to their respective row boundaries contour points. The moved contour points 1224, 1226 and 1228 may then linked to contour points 1212, 1214 and 1216 of contour 1204. Thus, the example of FIG. 12 illustrates a processing configuration for orientation 0 contours, where roots are configured on image row boundaries (IMAGE ROWS 3-5). The image may be rotated 90 degrees for orientation 2 contours, where roots may be configured on column boundaries. During processing, edges between the edges between the two roots may be exploited to determine contour movement.

FIGS. 13A-13B illustrate simulated images of a current and next frames according to some aspects of the present disclosure. As explained above in connection with FIG. 3, a current image is received in a contour extractor logic 308 of sensor processor 302, where FIG. 13A represents the current frame (image A), a next image (image B) in a series of frames, is received in another respective contour extractor logic 310 of sensor processor 302, where FIG. 13B represents the image of the next frame. FIGS. 14A-14B illustrate a simulated contour image of the current and next frames according to some aspects of the present disclosure. As discussed above, contour extractor logics 308, 310 may be configured to generate contours from a current image A 304 and a next image B 306, where those contours are illustrated in FIGS. 14A and 14B, respectively. FIGS. 15A-15B illustrate simulated before and after effects of a frame contour matching process according to some aspects of the present disclosure. As discussed above, frame contour matcher logic 312 uses the contours from contour extractors 308, 310 to match the next frame (image B 306) to an optical center of the current frame (image A 304) to an output of frame contour matcher logic 312 having a current image and a next image as illustrated in FIGS. 15A and 15B, respectively.

Figure 16A:
FIGS. 16A-16E illustrate simulated operation of an affine contour matcher for various increasing image scales according to some aspects of the present disclosure.
Figure 16B:
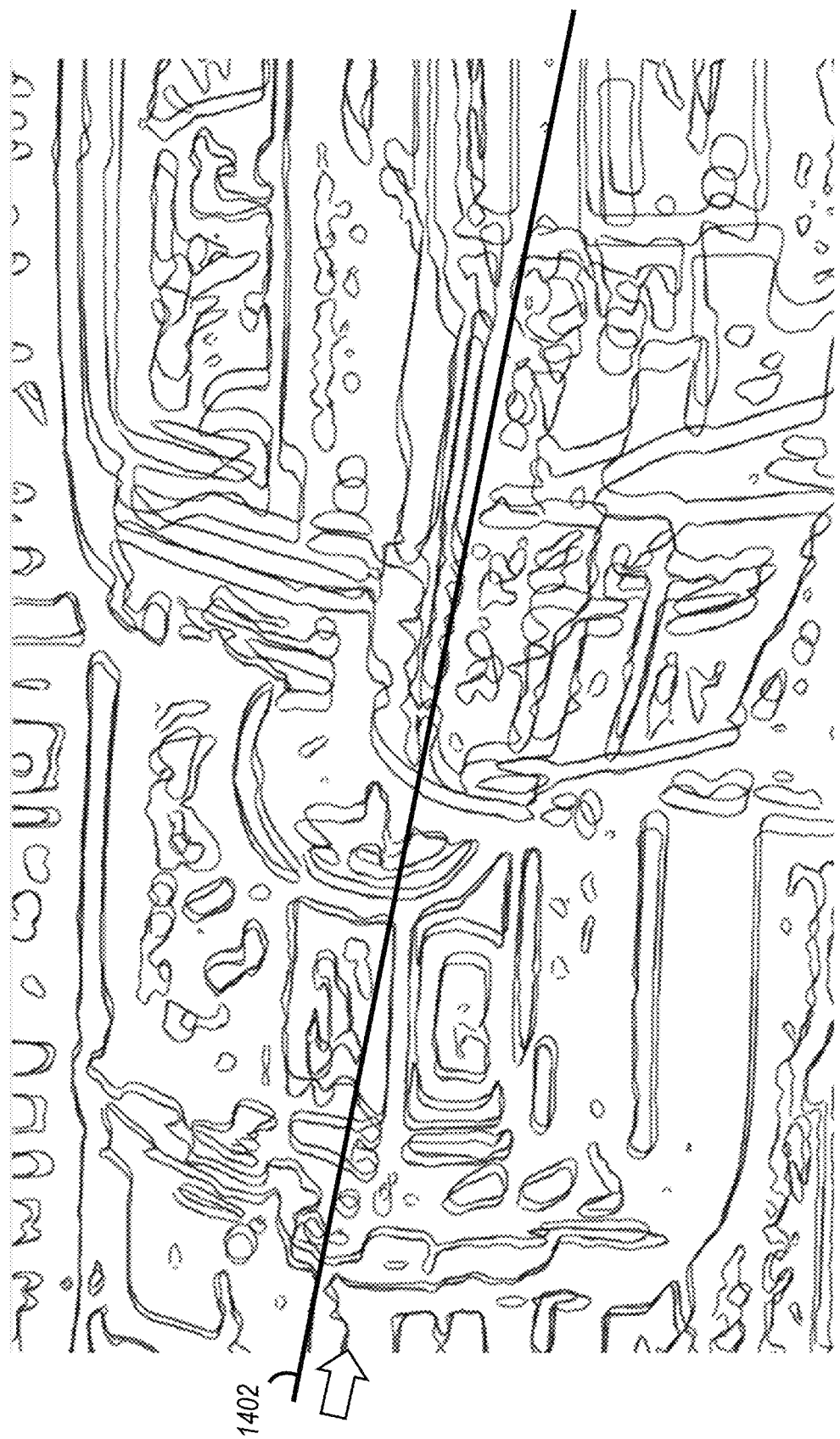
Figure 16C:
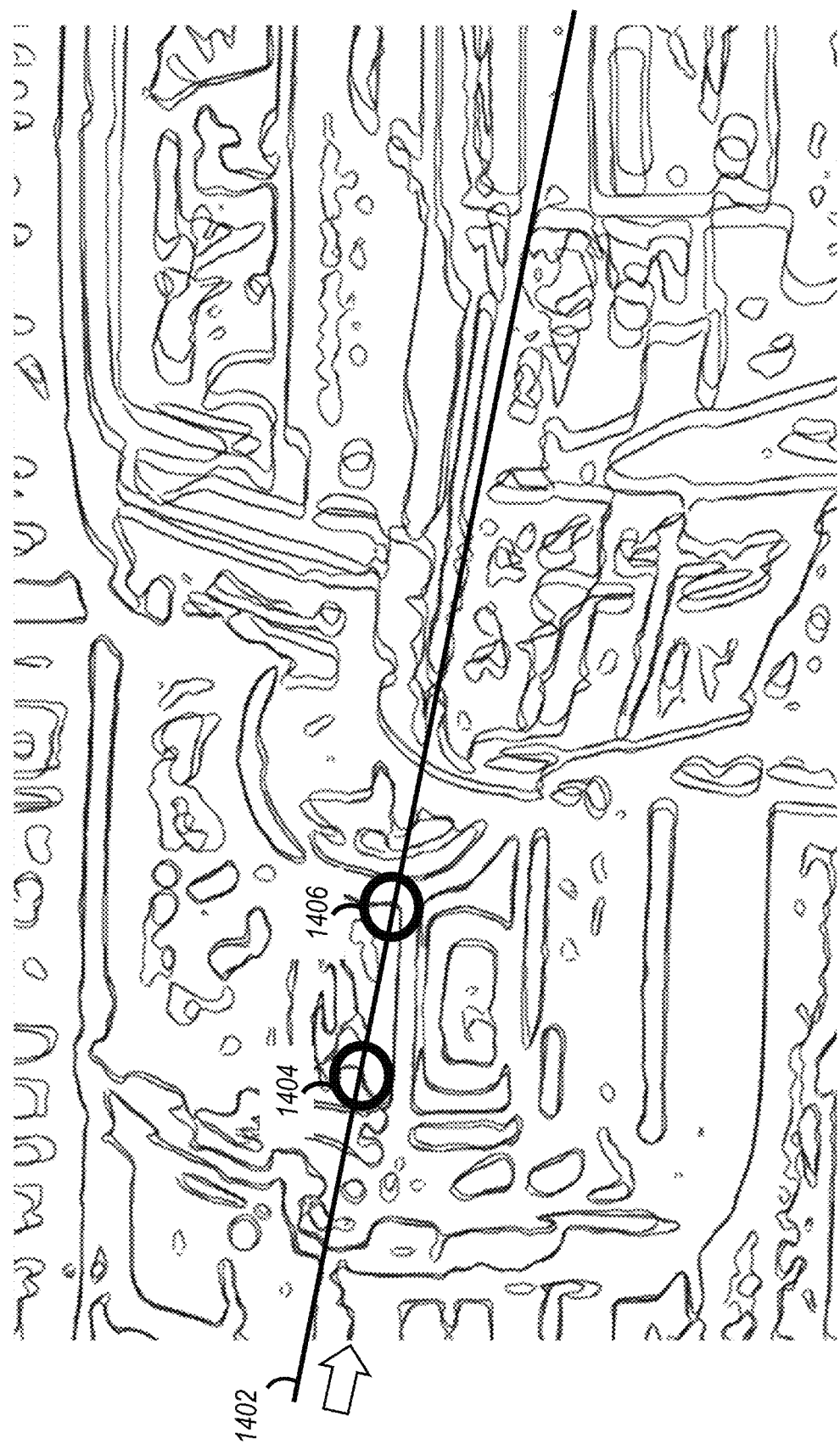
Figure 16D:
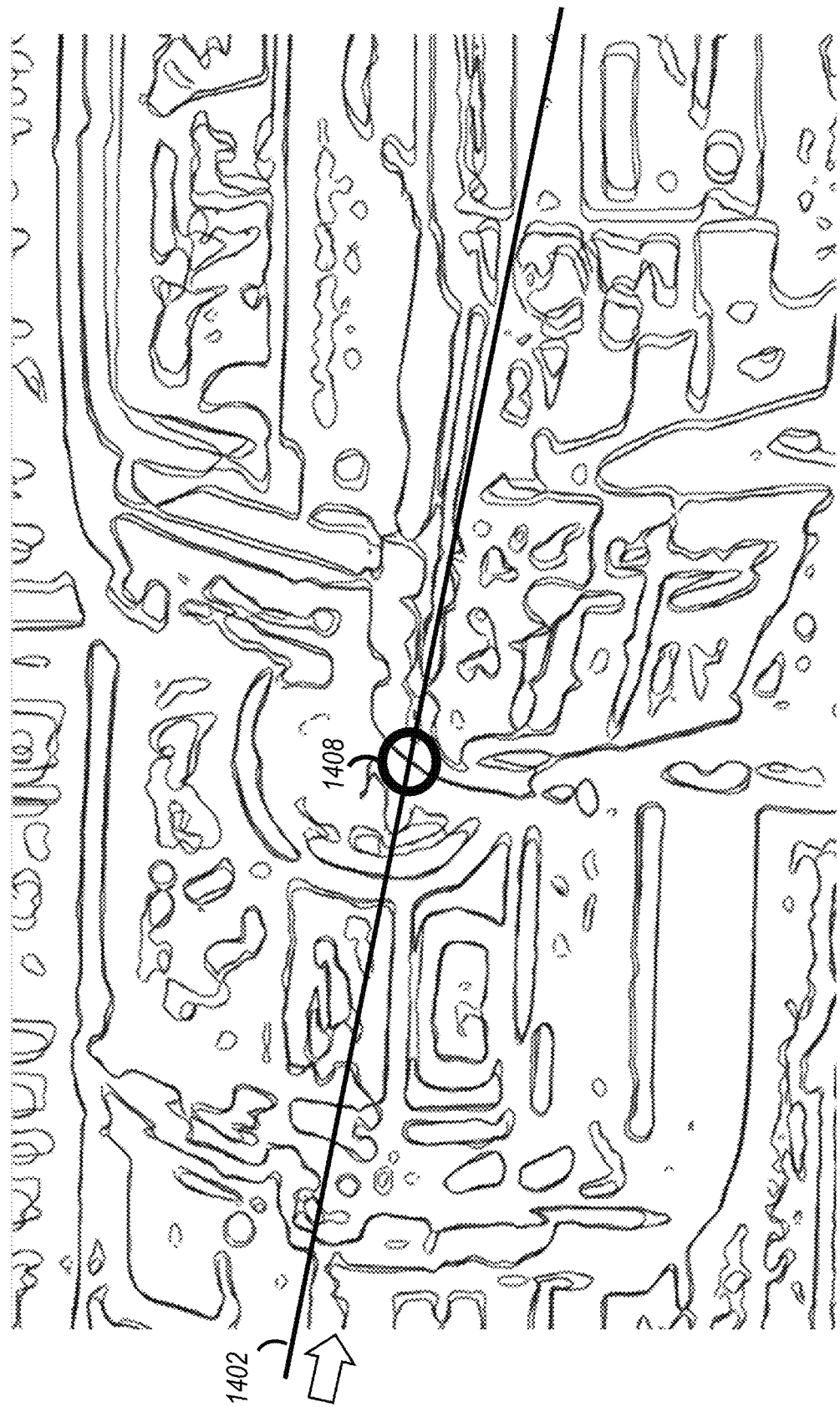
Figure 16E:
Figure 17:
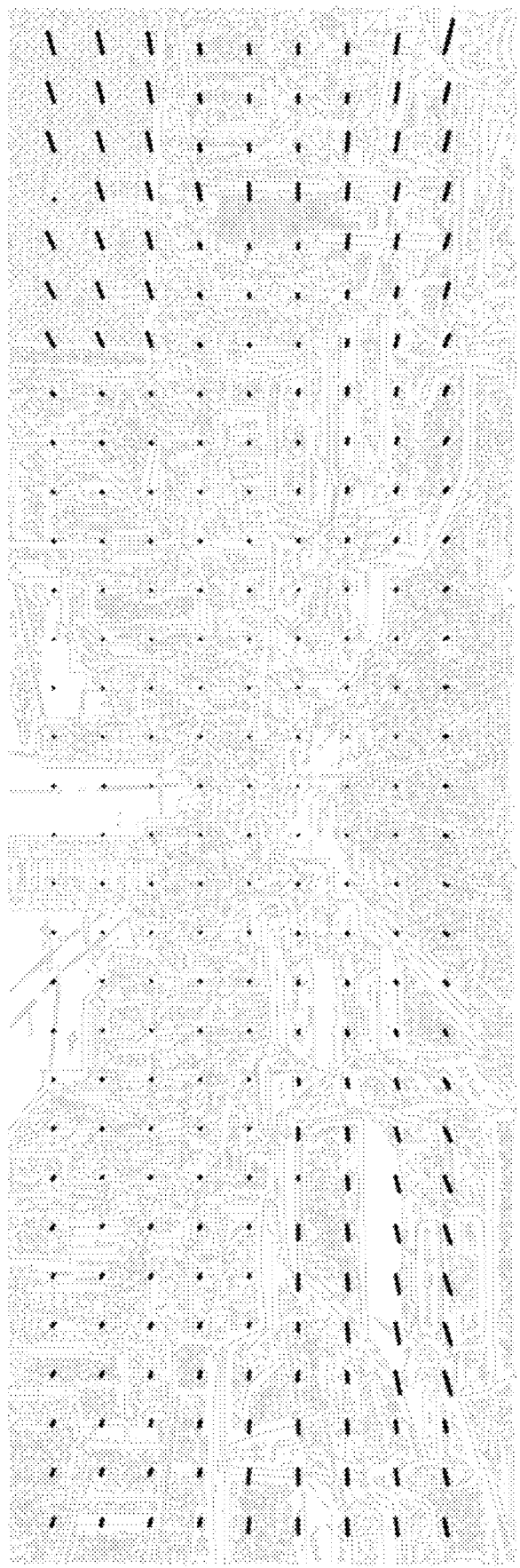
FIG. 17 illustrates a simulated application of an affine contour grid to an image according to some aspects of the present disclosure.

FIGS. 16A-16E illustrate simulated operation of an affine contour matcher for various increasing image scales according to some aspects of the present disclosure. As discussed above, the output of frame contour matching logic 312, which may be configured as an image map, may be transmitted to affine contour matcher logic 314. FIG. 16A shows example of a simulated output of affine contour matcher logic 314 illustrating an image for an image scale 1, where the FOE radial 1402 is configured as shown, and the image flow direction is shown by the arrow. FIG. 16B shows the next image for an image scale 2, and FIG. 16C shows the following image for image scale 3. In this example, image contours points 1404, 1406 may be determined to be matching along the FOE radial line 1402. FIG. 16D shows the following image for image scale 4, where matching image contours point 1408 may be determined further along the FOE radial line 1402, and FIG. 16D shows the following image for image scale 5, where matching image contours point 1410 may be determined further still along the FOE radial line 1402.

FIG. 17 illustrates a simulated application of an affine contour grid to an image via affine contour matcher logic 314 according to some aspects of the present disclosure. In this example, the image shows results from estimating image velocity for a coarse grid of points across the image using affine transformation. FIG. 18 illustrates a simulated application of a projective contour grid to an image according to some aspects of the present disclosure, where the coarse grid of image velocities are used to initialize a finer projective contour grid in projective contour matcher logic 316.

Figure 20:
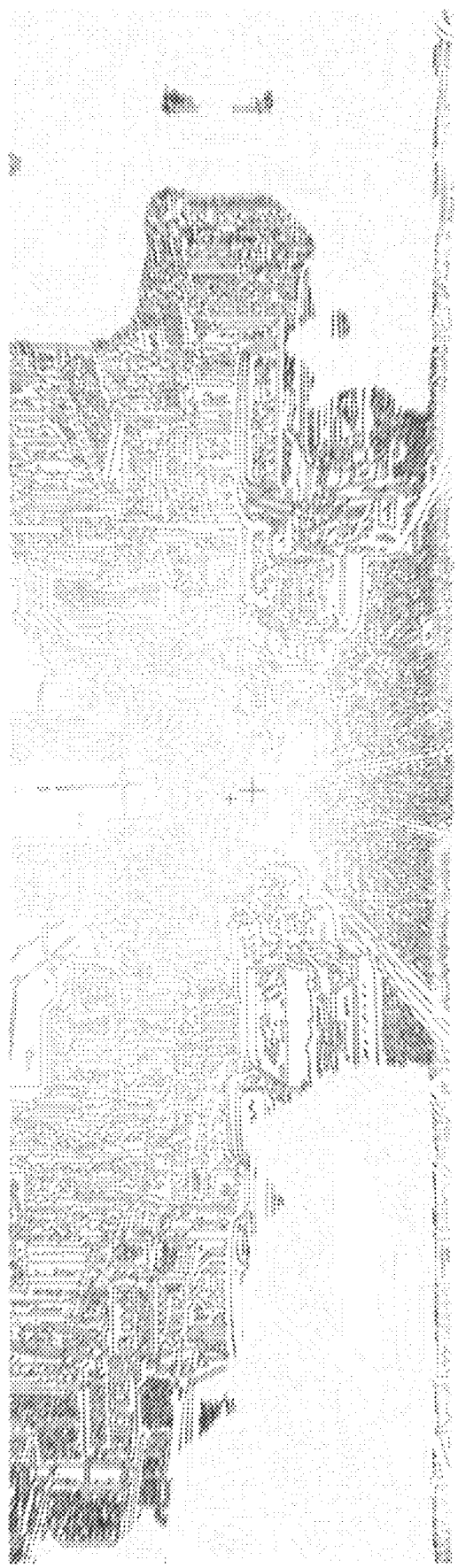
FIG. 20 illustrates a simulated example of the image velocities computed for each contour point in the image according to some aspects of the present disclosure.
Figure 21:
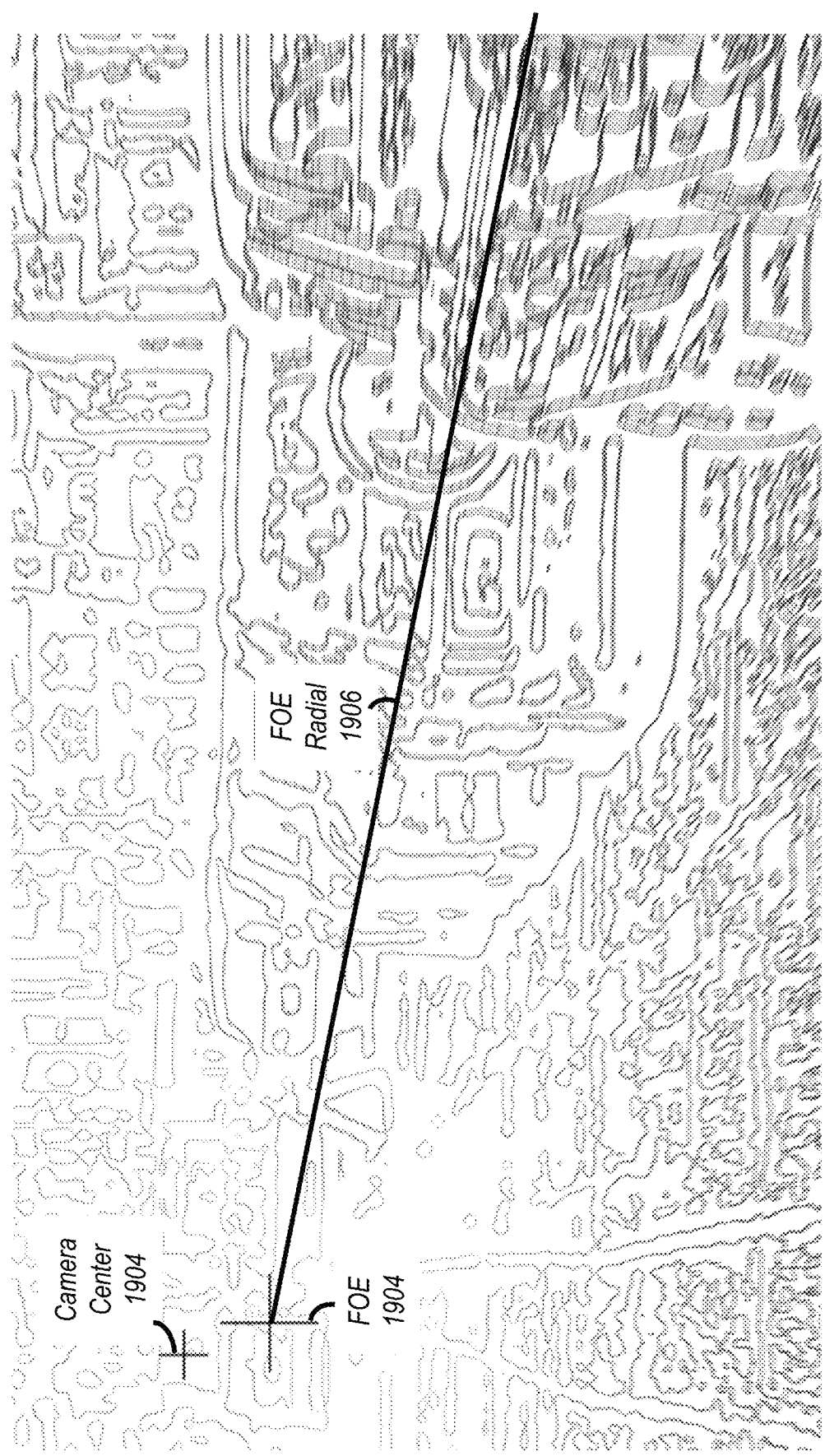
FIG. 21 illustrates a relationship of a FOE and image velocities for a sample image according to some aspects of the present disclosure.

FIG. 19 illustrates a simulated sample of the results of a projective contour process according to some aspects of the present disclosure. FIG. 20 illustrates a simulated example of the image velocities computed for each contour point in the image according to some aspects of the present disclosure. FIG. 21 illustrates a relationship of a FOE and image velocities for a sample image according to some aspects of the present disclosure. In this example, the FOE radial 1906 may be projected from a FOE 1904, positioned relative to camera center 1904, as shown in the figure.

Figure 22:
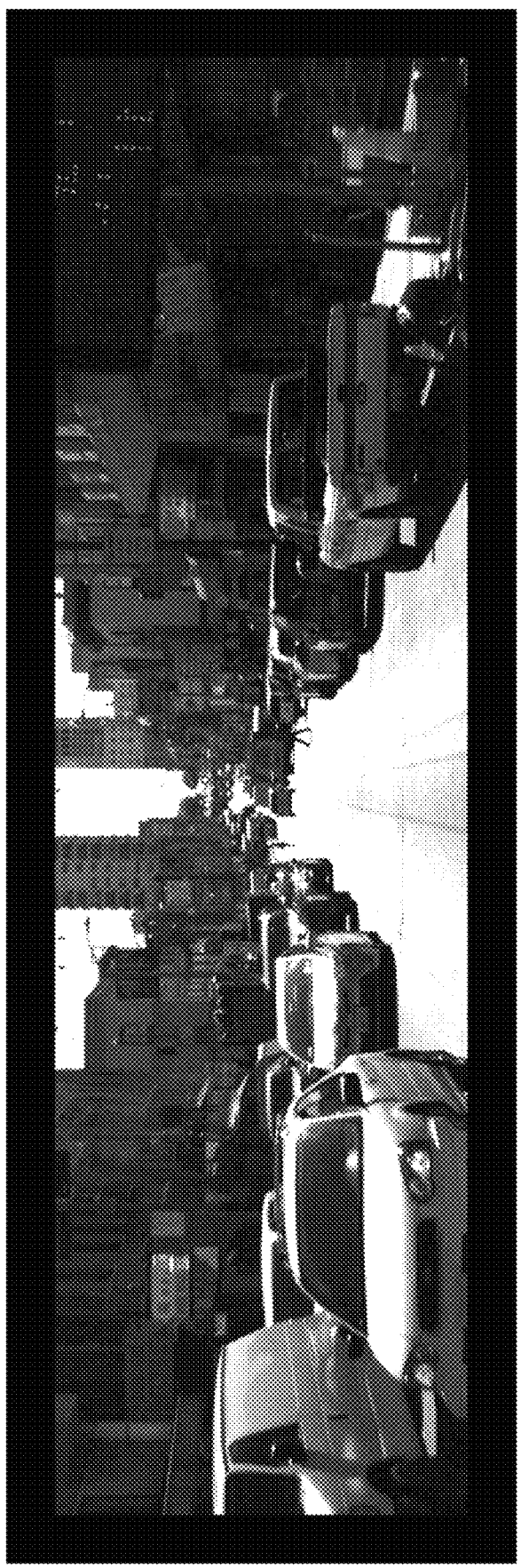
FIG. 22 illustrates a simulated example of the next image remapped to match a current image according to some aspects of the present disclosure.
Figure 23:
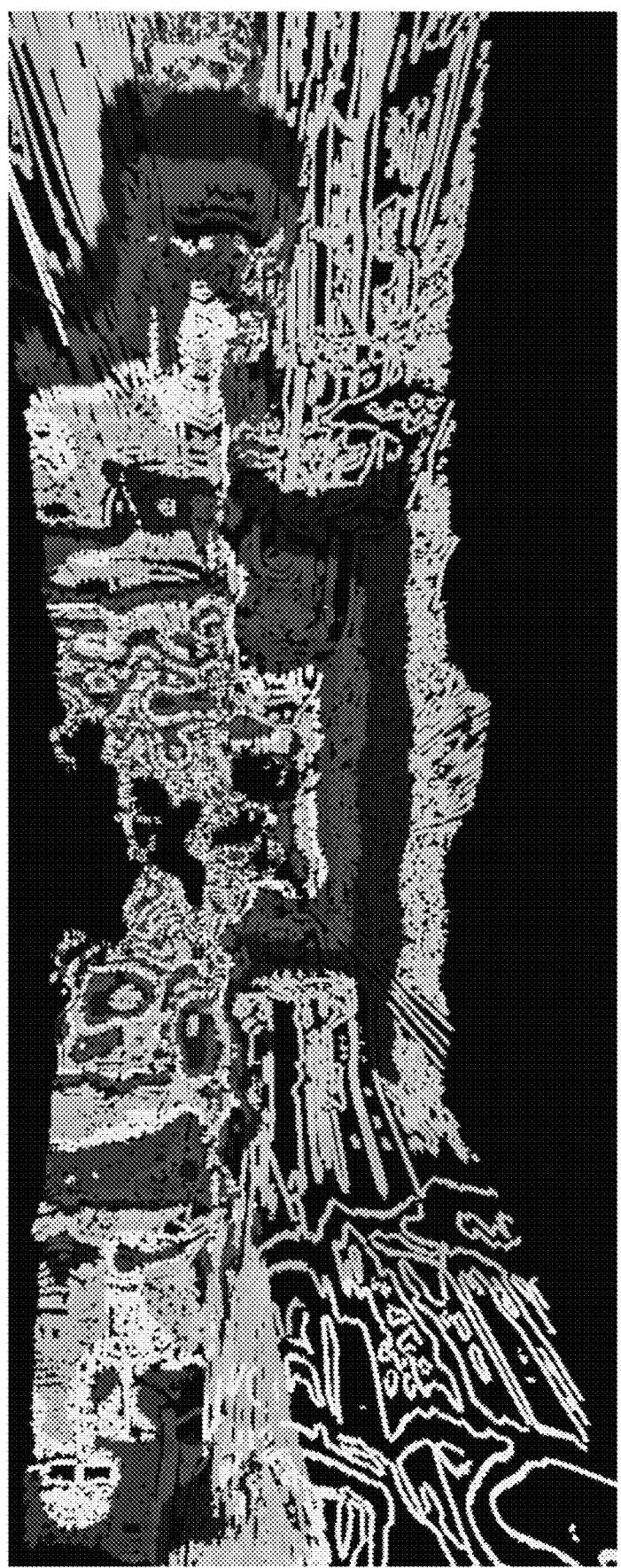
FIG. 23 illustrates a simulated example of a time-to-collision (TTC) contour cloud displayed in three-dimensions (3D) according to some aspects of the present disclosure.

FIG. 22 illustrates a simulated example of the next image (e.g., 306) remapped to match a current image (e.g., 304) according to some aspects of the present disclosure. FIG. 23 illustrates a simulated example of a time-to-collision (TTC) contour cloud (e.g., 328) displayed in three-dimensions (3D) according to some aspects of the present disclosure.

Figure 24:
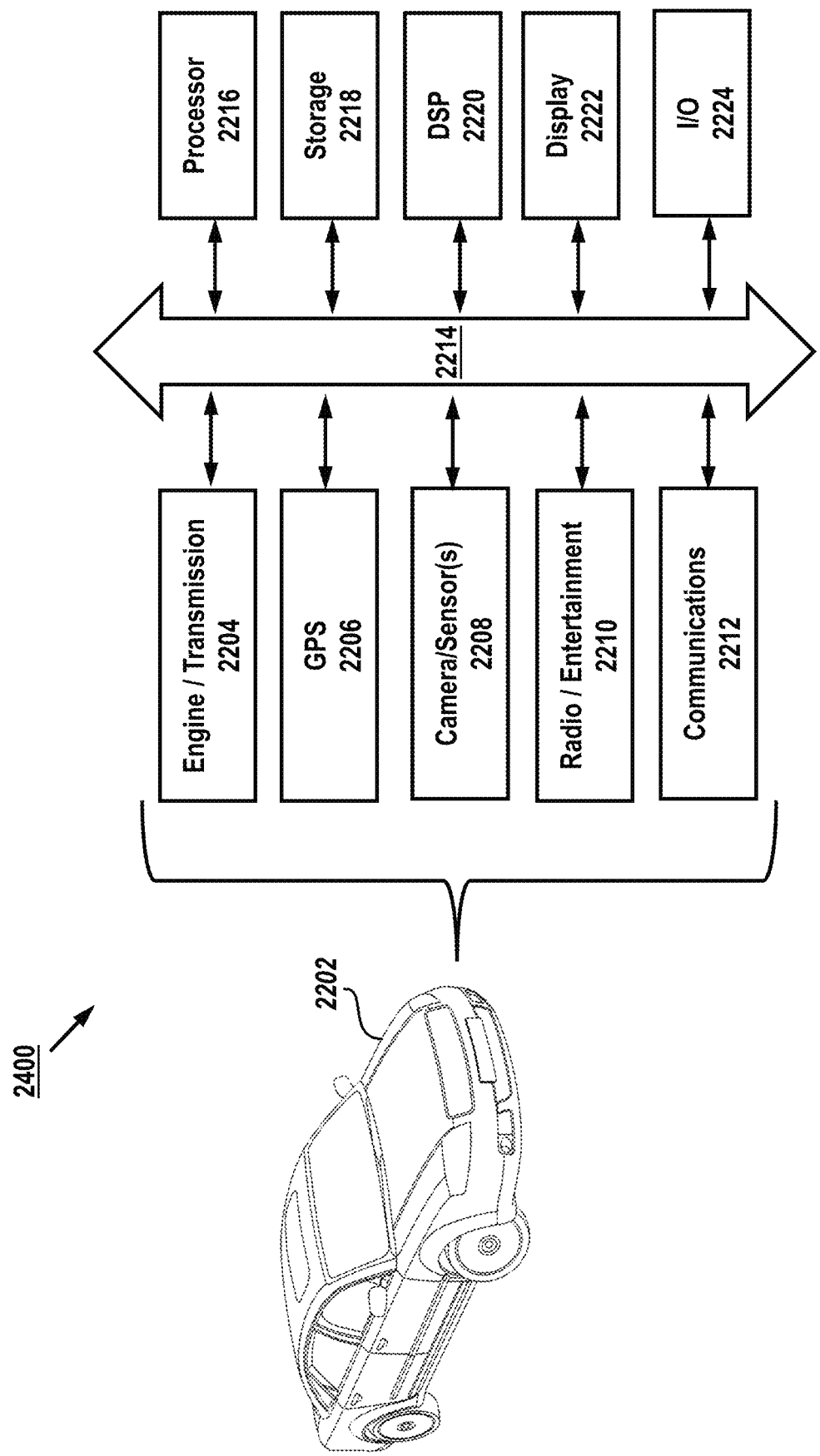
FIG. 24 shows an exemplary vehicle system block diagram showing multiple components and modules, together with a sensor system according to some aspects of the present disclosure.

Turning to FIG. 24, the drawing illustrates an exemplary system 2400 for a vehicle 2202 comprising various vehicle electronics, circuits, logics, subsystems and/or components according to come aspects of the present disclosure. Engine/transmission circuit 2404 is configured to process and provide vehicle engine and transmission characteristic or parameter data, and may comprise an engine control unit (ECU), and a transmission control. For a diesel engine, circuit 2204 may provide data relating to fuel injection rate, emission control, NOx control, regeneration of oxidation catalytic converter, turbocharger control, cooling system control, and throttle control, among others. For a gasoline and/or hybrid engine, circuit 2204 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals for any of gasoline, hybrid and/or electrical engines.

Global positioning system (GPS) circuit 2206 provides navigation processing and location data for the vehicle 2202. The camera/sensors 2208 may include a sensor processor (e.g., 302) and provide image or video data (with or without sound), and sensor data which may comprise image data, as well as data relating to vehicle characteristic and/or parameter data, and may also provide environmental data pertaining to the vehicle, its interior and/or surroundings, such as temperature, humidity and the like, and may further include LiDAR, radar, and computer vision. Radio/entertainment circuit 2210 may provide data relating to audio/video media being played in vehicle 2202. The radio/entertainment circuit 2210 may be integrated and/or communicatively coupled to an entertainment unit configured to play AM/FM radio, satellite radio, compact disks, DVDs, digital media, streaming media and the like. Communications circuit 2212 allows any of the circuits of system 2400 to communicate with each other and/or external devices via a wired connection (e.g., Controller Area Network (CAN bus), local interconnect network, etc.) or wireless protocol, such as Wi-Fi, Bluetooth, NFC, etc. In one embodiment, circuits 2204-2212 may be communicatively coupled to bus 2214 for certain communication and data exchange purposes.

Vehicle 2202 may further comprise a main processor 2216 (also referred to herein as a "processing apparatus") that centrally processes and controls data communication throughout the system 2400. In some illustrative embodiments, the processor 2216 is equipped with advanced driver assistance circuits that allow for communication with and control of any of the circuits in vehicle 2202. Storage 2218 may be configured to store data, software, media, files and the like, and may include vehicle data, sensor data and driver profile data, discussed in greater detail below. Digital signal processor (DSP) 2220 may comprise a processor separate from main processor 2216, or may be integrated within processor 2216. Generally speaking, DSP 2220 may be configured to take signals, such as voice, audio, images, video, temperature, pressure, position, etc. that have been digitized and then process them as needed. Display 2222 may be configured to provide visual (as well as audio) indicial from any circuit in FIG. 24, and may be a configured as a LCD, LED, OLED, or any other suitable display. The display 2222 may also be configured with audio speakers for providing audio output. Input/output circuit 2224 is configured to provide data input and outputs to/from other peripheral devices, such as cell phones, key fobs, device controllers and the like. As discussed above, circuits 2216-2224 may be communicatively coupled to data bus 2214 for transmitting/receiving data and information from other circuits.

As described above, some or all illustrated features may be omitted in a particular implementation within the scope of the present disclosure, and some illustrated features may not be required for implementation of all examples. In some examples, the methods and processes described herein may be performed by a vehicle (e.g., 2202), as described above and/or by a processor/processing system or circuitry (e.g., 2204-2224) or by any suitable means for carrying out the described functions.

FIG. 25 illustrates a method 2500 for vehicle perception for a sensor processing system according to some aspects of the present disclosure. In block 2502, image data (e.g., 102) may be received from a camera (e.g., 106), wherein the image data comprises a current image and a next image (e.g., 304, 306). In block 2504, a contour extractor (e.g., 304, 306) may determine a first contour (e.g., 814) of the current image relative to an optical center (e.g., 804). In block 2506, the contour extractor may determine a second contour (e.g., 810) of the next image relative to the optical center. In block 2508, an affine contour matcher (e.g., 314) may scale the current image to the next image relative to the optical center, wherein the scaling comprises applying a scale vector (e.g., 812, 818) to the first contour. In block 2510, the affine contour matcher may determine a frame offset vector (e.g., 816), and translating the second contour, based on the frame offset vector and the scale vector, to align the translated second contour to a focus of expansion (e.g., 802). In block 2512, an image velocity (e.g., 826) may be determined, based on the first contour and the translated second contour, wherein the image velocity is used to determine object movement from the image data.

In some examples, the method may further include generating at least one of a relative pose (e.g., 324) and time-to-collision (TTC) contour cloud (e.g., 328), based on the image velocity of image map data. The TTC contour cloud may be generated by converting the TTC contour cloud to an image depth map. In some examples, applying the scale vector may include scaling one of the current image or the next image, before the first contour or second contour is determined. In some examples, the received image data from the camera comprises image data from a mono camera.

In some examples, the affine contour matcher may be configured to align the translated second contour within a tunable parameter. The tunable parameter may comprise a value of 0.5 pixels or less.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A sensor processing system for vehicle perception, comprising:
    a memory, configured to receive image data from a camera, wherein the image data comprises a current image and a next image;
    a contour extractor, operatively coupled to the memory, wherein the contour extractor is configured to (i) determine a first contour of the current image relative to an optical center, and (ii) determine a second contour of the next image relative to the optical center; and
    an affine contour matcher, operatively coupled to the contour extractor, wherein the affine contour matcher is configured to (i) scale the current image to the next image relative to the optical center, wherein the scaling comprises applying a scale vector to the first contour, (ii) determine a frame offset vector, and (iii) translate the second contour, based on the frame offset vector and the scale vector, to align the translated second contour to a focus of expansion,
    wherein the sensor processing system is configured to determine an image velocity based on the first contour and the translated second contour, wherein the image velocity is used to determine object movement from the image data.

2. The sensor processing system of claim 1, wherein the image data comprises image map data, and wherein the sensor processing system is configured to generate at least one of a relative pose and time-to-collision (TTC) contour cloud based on the image velocity.

3. The sensor processing system of claim 2, wherein the sensor processing system is configured to convert the TTC contour cloud to a depth map.

4. The sensor processing system of claim 1, wherein the affine contour matcher is configured to scale one of the current image or the next image, before the first contour or second contour is determined.

5. The sensor processing system of claim 1, wherein the received image data from the camera comprises image data from a mono camera.

6. The sensor processing system of claim 1, wherein the affine contour matcher is configured to align the translated second contour within a tunable parameter.

7. The sensor processing system of claim 6, wherein the tunable parameter comprises 0.5 pixels or less.

8. A method for vehicle perception, comprising:
    receiving image data from a camera, wherein the image data comprises a current image and a next image;
    determining, via a contour extractor, a first contour of the current image relative to an optical center;
    determining, via the contour extractor, a second contour of the next image relative to the optical center;
    scaling, via an affine contour matcher, the current image to the next image relative to the optical center, wherein the scaling comprises applying a scale vector to the first contour;
    determining, via the affine contour matcher, a frame offset vector, and translating the second contour, based on the frame offset vector and the scale vector, to align the translated second contour to a focus of expansion; and
    determining an image velocity based on the first contour and the translated second contour, wherein the image velocity is used to determine object movement from the image data.

9. The method of claim 8, further comprising generating at least one of a relative pose and time-to-collision (TTC) contour cloud, based on the image velocity of image map data.

10. The method of claim 9, wherein generating the TTC contour cloud comprises converting the TTC contour cloud to an image depth map.

11. The method of claim 8, wherein applying the scale vector comprises scaling one of the current image or the next image, before the first contour or second contour is determined.

12. The method of claim 8, wherein the received image data from the camera comprises image data from a mono camera.

13. The method of claim 8, wherein the affine contour matcher is configured to align the translated second contour within a tunable parameter.

14. The method of claim 13, wherein the tunable parameter comprises 0.5 pixels or less.

15. A computer-readable storage medium, including a set of executable instructions that causes a vehicle sensor processing system to:
  receive image data from a camera, wherein the image data comprises a current image and a next image;
  determine a first contour of the current image relative to an optical center;
  determine a second contour of the next image relative to the optical center;
  scale the current image to the next image relative to the optical center, wherein the scaling comprises applying a scale vector to the first contour;
  determine a frame offset vector, and translate the second contour, based on the frame offset vector and the scale vector, to align the translated second contour to a focus of expansion; and
  determine an image velocity, based on the first contour and the translated second contour, wherein the image velocity is used to determine object movement from the image data.

16. The computer-readable storage medium of claim 15, wherein the set of executable instructions are further configured to cause the vehicle sensor processing system to generate at least one of a relative pose and time-to-collision (TTC) contour cloud, based on the image velocity of image map data.

17. The computer-readable storage medium of claim 16, wherein the set of executable instructions are further configured to cause the vehicle sensor processing system to generate the TTC contour cloud by converting the TTC contour cloud to an image depth map.

18. The computer-readable storage medium of claim 15, wherein the set of executable instructions are further configured to cause the vehicle sensor processing system to apply the scale vector by scaling one of the current image or the next image, before the first contour or second contour is determined.

19. The computer-readable storage medium of claim 15, wherein the received image data from the camera comprises image data from a mono camera.

20. The computer-readable storage medium of claim 15, wherein the set of executable instructions are further configured to cause the vehicle sensor processing system to align the translated second contour within a tunable parameter comprising 0.5 pixels or less.

* * * * *